(12) United States Patent
Singh et al.

(10) Patent No.: US 12,500,507 B2
(45) Date of Patent: Dec. 16, 2025

(54) METHOD AND SYSTEM FOR CONTROLLING A DIRECT-CURRENT-TO-DIRECT-CURRENT CONVERTER WITH THERMAL MANAGEMENT

(71) Applicant: Deere & Company, Moline, IL (US)

(72) Inventors: Brij N. Singh, West Fargo, ND (US); Richard E. Wainwright, West Fargo, ND (US); Yuheng Wu, Fayetteville, AR (US)

(73) Assignee: DEERE & COMPANY, Moline, IL (US)

( * ) Notice: Subject to any disclaimer, the term of this patent is extended or adjusted under 35 U.S.C. 154(b) by 264 days.

(21) Appl. No.: 18/463,679

(22) Filed: Sep. 8, 2023

(65) Prior Publication Data

US 2024/0348148 A1     Oct. 17, 2024

Related U.S. Application Data

(60) Provisional application No. 63/495,676, filed on Apr. 12, 2023.

(51) Int. Cl.
*H02M 1/08*     (2006.01)
*H02M 1/00*     (2006.01)
*H02M 3/156*     (2006.01)

(52) U.S. Cl.
CPC ......... *H02M 1/081* (2013.01); *H02M 1/0009* (2021.05); *H02M 1/0022* (2021.05); *H02M 3/156* (2013.01)

(58) Field of Classification Search
CPC ...... H02M 1/081; H02M 1/082; H02M 1/083; H02M 1/084; H02M 1/0845; H02M 1/088; H02M 1/08; H02M 1/0022; H02M 1/0025; H02M 1/0041; H02M 1/0006; H02M 1/0003; H02M 1/0009; H02M 1/0012; H02M 1/0016; H02M 3/156; H02M 3/155; H02M 3/1552; H02M 3/1555; H02M 3/1557; H02M 3/1563; H02M 3/1566; H02M 3/158
See application file for complete search history.

(56) References Cited

U.S. PATENT DOCUMENTS

| | | | |
|---|---|---|---|
| 5,438,502 A | * | 8/1995 | Rozman ................ H02M 7/48 363/79 |
| 9,203,322 B2 | | 12/2015 | Muto |
| 10,749,441 B1 | | 8/2020 | Singh et al. |

(Continued)

OTHER PUBLICATIONS

He Li et al., Current cooperative control of multiple DC-DC converter systems with inductive load, ECITech2022, Mar. 25-27, 2022, pp. 419-423, ISBN 978-3-8007-5916-3.

(Continued)

*Primary Examiner* — Nguyen Tran

(57) ABSTRACT

In accordance with one embodiment, a driver is configured to adjust a phase offset of driver control signals between corresponding switches of the same phase of the primary converter and the secondary converter consistent with the target power transfer and the estimated electromagnetic circuit inductance (e.g., comprising a leakage inductance), to minimize thermal energy dissipated from the direct-current-to-direct current converter or its transformer for the sampling time interval.

10 Claims, 8 Drawing Sheets

(56) References Cited

U.S. PATENT DOCUMENTS

| | | |
|---|---|---|
| 2015/0138840 A1 | 5/2015 | Muto |
| 2021/0288581 A1 | 9/2021 | Zhu et al. |
| 2022/0045628 A1 | 2/2022 | Chen et al. |
| 2022/0052623 A1* | 2/2022 | Ou .................... H02M 7/48 |

OTHER PUBLICATIONS

Junaid Saeed et al., Disturbance Observer based Discrete-Time Constrained Anti-Windup Control of Full-Bridge DC-DC Converter, 2020 Australian & New Zealand Control Conference, Nov. 26-27, 2020, pp. 61-66.
Extended European Search Report and Written Opinion issued in European Patent Application No. 24157192.6 dated Jul. 22, 2024, in 12 pages.
Guo Bo et al., Electrical Topology and Control of Four-wheel Hub Motor Pure Electric Vehicle, 2022 IEEE 5th International Electrical and Energy Conference (CIEEC), IEEE, May 27, 2022, pp. 951-956, XP034168801, DOI: 10.1109/CIEEC54735.2022.9846856, [retrieved on Aug. 11, 2022].
Yadav Yadvendra Singh et al., A Generic Current Sensorless Control Scheme for Dual Active Bridge Converter, 2022 IEEE International Conference On Power Electronics, Drives and Energy Systems (PEDES), IEEE, Dec. 14, 2022, pp. 1-6, XP034321314, DOI: 10.1109/PEDES56012.2022.10080530, [retrieved on Mar. 30, 2023].
Li Liting et al., Review of Dual-Active-Bridge Converters with Topological Modifications, IEEE Transactions On Power Electronics, Institute of Electrical and Electronics Engineers, USA, vol. 38, No. 7, Mar. 16, 2023, pp. 9046-9076, XP011940844, ISSN: 0885-8993, DOI: 10.1109/TPEL.2023.3258418 [retrieved on Mar. 17, 2023].

\* cited by examiner

— Primary-bridge AC current (inductor current) under normal inductance

--- --- Primary-bridge AC current (inductor current) under saturated inductance

METHOD AND SYSTEM FOR CONTROLLING A DIRECT-CURRENT-TO-DIRECT-CURRENT CONVERTER WITH THERMAL MANAGEMENT

RELATED APPLICATION

This document (including the drawings) claims priority and the benefit of the filing date based on U.S. application No. 63/495,676, filed Apr. 12, 2023, under 35 U.S.C. § 119 (e), where the provisional application is hereby incorporated by reference herein.

FIELD

This disclosure relates to a method and system for controlling a direct-current-to-direct-current converter with thermal management.

BACKGROUND

In some prior art, a direct-current-to-direct-current converter, such as a three-phase, dual-active-bridge converter, is used to interface with or to convert direct (DC) bus voltages between a first voltage level and a second voltage level of DC voltage. For example, a primary converter is coupled to a secondary converter via a transformer, where the primary converter is associated with a device or load at the first voltage level and where the secondary converter is associated with a device or load at a second voltage level. The efficiency and heat dissipation of the converter may vary with changes in the load and/or operating point of the converter. Accordingly, there is need for method and system for controlling a direct-current to a direct-current converter that generates less thermal energy by adjusting a phase offset (e.g., of a pulse-width modulation control signal) between the primary converter and secondary converter associated with a corresponding load and/or operating point.

In accordance with one embodiment, a system and method for controlling a direct-current-to-direct-current converter comprises a primary converter coupled to a secondary converter via a transformer. Voltage sensors are configured to detect a primary direct current (DC) voltage and a secondary direct current (DC) voltage for a sampling time interval. One or more current sensors are configured to detect a respective secondary alternating current (AC) at one or more corresponding secondary alternating current nodes for the sampling time interval, where each of the secondary alternating current nodes is associated with a corresponding phase of the secondary converter.

An estimator or electronic data processor is configured to estimate an electromagnetic circuit inductance (e.g., leakage inductance) of the transformer for the sampling time interval based on one or more of the following: a change per unit time in the detected secondary alternating current, the detected primary direct current voltage, and the detected secondary direct current voltage. The electronic data processor is configured to determine a target power transfer between the primary converter to the secondary converter consistent with the estimated electromagnetic circuit inductance for the sampling time interval. A driver is configured to adjust a phase offset of driver control signals between corresponding switches of the same phase of the primary converter and the secondary converter consistent with the target power transfer and the estimated electromagnetic circuit inductance (e.g., comprising a leakage inductance), to minimize thermal energy dissipated from the direct-current-to-direct current converter or its transformer for the sampling time interval.

DESCRIPTION OF THE PREFERRED EMBODIMENTS

In any of the above referenced drawings of this document, any arrow or line that connects any blocks, components, modules, multiplexers, sensors, switches, diodes, memory, data storage, data processors, electronic components, oscillators, or other electronic or software modules may comprise one or more of the following items: a physical path of electrical signals, a physical path of an electromagnetic signal, a logical path for data, one or more data buses, a circuit board trace, a transmission line; a link, call, communication, or data message between software modules, programs, data, or components; or transmission or reception of data messages, software instructions, modules, subroutines or components.

In one embodiment, the system and method disclosed in this document may comprise a computer-implemented system, method or converter in which one or more data processors process, store, retrieve, and otherwise manipulate data via data buses and one or more data storage devices (e.g., data storage device or memory) as described in this document and the accompanying drawings. As used in this document, "configured to, adapted to, or arranged to" mean that the data processor, converter or controller is programmed with suitable software instructions, software modules, executable code, data libraries, and/or requisite data to execute any referenced functions, mathematical operations, logical operations, calculations, determinations, processes, methods, algorithms, subroutines, or programs that are associated with one or more blocks set forth in any other drawing in this disclosure. Alternately, separately from or cumulatively with the above definition, "configured to, adapted to, or arranged to" can mean that the converter comprises one or more components described herein as software modules, equivalent electronic hardware modules, or both to execute any referenced functions, logic operations, mathematical operations, calculations, determinations, processes, methods, algorithms, subroutine.

Figure 1:
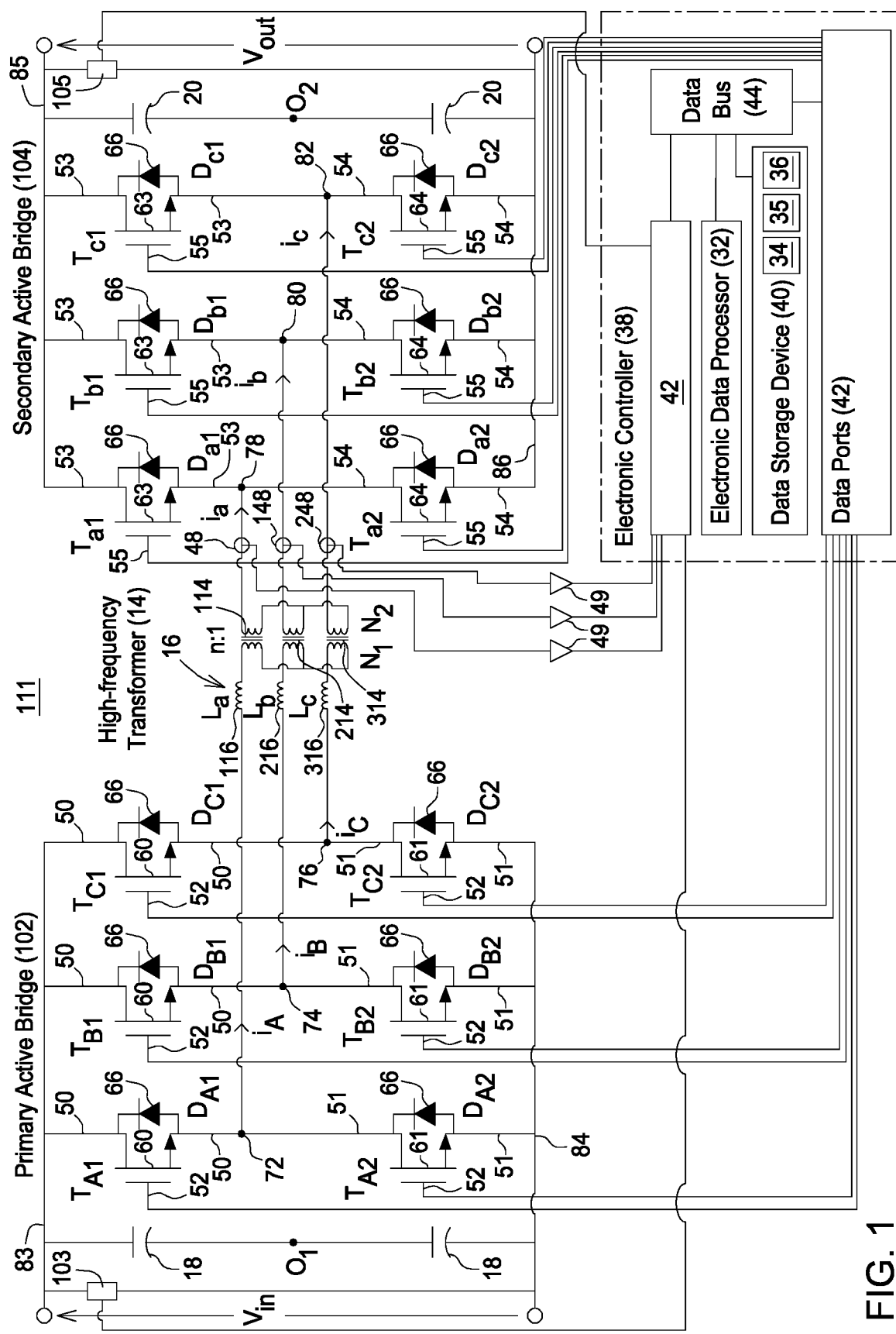
FIG. 1 is a schematic diagram of a first embodiment of a three-phase, dual active bridge, direct-current-to-direct-current-converter that comprises a primary active bridge converter coupled to a secondary active bridge converter via a transformer.

In accordance with one embodiment, FIG. 1 illustrates a system 111 for controlling a direct-current (DC) to direct-current (DC) converter for improved thermal efficiency. In FIG. 1, a primary active bridge converter 102 (e.g., primary converter) comprises first pair of primary switches (60, 61), a second pair of primary switches (60, 61), and third pair of primary switches (60, 61) with respective switched terminals (50, 51) coupled between the primary direct current terminals (83, 84) of the primary active bridge converter 10 (e.g., primary converter). Each pair of switches comprises a low-side switch 61 and a high-side switch 60. The switched terminals (50, 52) refer to the source and drain of any switch that comprises a field effect transistor, or the emitter and collector of bipolar junction transistor. Meanwhile, the control terminal 52 refers to the gate of any switch that comprises a field effect transistor or the base of a bipolar junction transistor.

A secondary active bridge converter 104 (e.g., secondary converter) comprises a first pair of secondary switches (63, 64), second pair of secondary switches (63, 64) and a third pair of secondary switches (65, 66) with respective switched terminals (53, 54) coupled between secondary direct current output terminals (85, 86) of the secondary active bridge converter 104 (e.g., secondary converter). Similar to the primary, in the secondary the switched terminals (53, 54) refer to the source and drain of any switch that comprises a field effect transistor, or the emitter and collector of bipolar junction transistor. Meanwhile, the control terminal 55 refers to the gate of any switch that comprises a field effect transistor or the base of a bipolar junction transistor.

A transformer 14 (e.g., isolation transformer) is coupled between the primary converter 102 and the secondary converter 104. As illustrated, each primary winding has a primary tap terminal and a primary common terminal; each secondary winding has a secondary tap terminal and a secondary common terminal; each tertiary winding has a tertiary tap terminal and a tertiary common terminal. In some configurations, the common terminals are coupled to ground, such as chassis ground potential or earth ground potential.

In on embodiment, as illustrated in FIG. 1, a first transformer 114 is coupled to a first alternating current node 72 of the first pair of primary switches; a second transformer 214 is coupled to a second alternating current node 74 of the second pair of primary switches; a third transformer 314 is coupled to a third alternating current node 76 of the third pair of primary switches.

In an alternate embodiment where the ferrite or iron core is single core for transformer 14, a first tap terminal of the transformer 14 is coupled to a first alternating current node 72 of the first pair of primary switches; a second tap terminal of the transformer 14 is coupled to a second alternating current node 74 of the second pair of primary switches; a third tap terminal of the transformer 14 is coupled to a third alternating current node 76 of the third pair of primary switches.

The transformer 14 has at least one primary winding and at least one secondary winding, where a transformer 14 ratio (n) represents a voltage ratio between the primary terminals and the secondary terminals, or between the primary winding and the secondary winding. For example, the ratio may represent the number of relative turns (n) of the primary winding to the secondary winding. The voltage ratio or winding ratio (turn ratio) may depend upon the winding configuration, the conductor configuration, and the configuration of any core, such as ferromagnetic core, a ferrite core, or an iron core.

The DC-to-DC converter 111 that comprises the primary active bridge 10, the secondary active bridge 102 and the transformer 14 can operate bi-directionally, such as where the electrical energy is transferred in either direction between the DC primary terminals (83, 84) and the DC secondary terminals (85, 86). In one direction, an energy source at the DC primary terminals (83, 84) can power a load at the DC secondary terminals (85, 86). However, in the opposite direction, the load at the DC secondary terminals (85, 86) can provide excess or transient energy to the primary DC terminals (83, 84) to charge the energy source. As illustrated, a capacitor, such as a primary capacitor 18 is placed across the DC primary terminals (83, 84) and a secondary capacitor 20 is placed across the DC secondary terminals (85, 86), where the primary capacitor 18 and the secondary capacitor 20 are used for filtering (e.g., to reduce noise, such as voltage ripple in the DC voltage).

In certain embodiments, the DC primary terminals (83, 84) are configured to operate at a different voltage level than the DC secondary terminals (85, 86). In other embodiments, the DC primary terminals (83, 84), the DC secondary voltage levels can have variable voltage levels that can fluctuate with the load or operating conditions on a dynamic basis for each time interval (e.g., sampling time of DC voltage observed at the DC primary input and DC secondary output terminals of the converter). For example, the DC primary terminals (83, 84) operate at a higher voltage level or higher voltage range (e.g., approximately 400 VDC to approximately 800 VDC) than a lower voltage level or lower voltage range (e.g., approximately 12 VDC to approximately 400 VDC) the DC secondary terminals (85, 86_. Accordingly, the electronic assembly or DC-to-DC converter 111 supports a vehicle with different DC bus levels that are isolated from each other because the transformer blocks DC energy from passing through between transformer primary and transformer secondary.

FIG. 1 illustrates a three-phase dual active bridge topology of the DC/DC converter, where the DC-to-DC converter has a primary active bridge and a secondary active bridge. In FIG. 1, node $O_1$ represents a midpoint primary direct current (DC) voltage level of the primary DC bus of the primary active bridge; node $O_2$ represents a midpoint secondary direct current (DC) voltage level of the secondary direct DC bus of the secondary active bridge, where each midpoint refers to the average, mean, mode or median of set of respective voltage levels. Primary AC nodes (72, 74, 76) are associated with phase outputs A, B, and C of primary active bridge 102; secondary AC nodes (78, 80, 82) are associated with phase outputs a, b, and c of the secondary active bridge 104.

The transformer 14 has node primary $N_1$, which is defined as neutral point of (e.g., Y-connected or star-connected)

primary winding of isolation transformer; the transformer 14 has secondary node $N_2$, which is defined as is neutral point of (e.g., a Y-connected or star-connected) secondary winding of isolation transformer 14, where the Y-connection is a connection such that one end of each winding of a multiphase transformer is connected to a neutral point or common point (e.g., at ground voltage level) and the other end of each winding is coupled to a signal terminal (e.g., at line level voltage).

Primary switches (60, 61) refer to semiconductor devices or transistors, comprising high-side switches $T_{A1}$, $T_{B1}$, $T_{C1}$ and low-side switches $T_{A2}$, $T_{B2}$, $T_{C2}$; where the first phase or phase A includes primary switches (60, 61), $T_{A1}$ and $T_{A2}$; the second phase or phase B includes primary switches (60, 61), $T_{B1}$ and $T_{B2}$; the third phase or phase C includes primary switches (60, 61), $T_{C1}$ and $T_{C2}$. The protection diodes 66 refer to primary diodes, $D_{A1}$, $D_{A2}$; $D_{B1}$, $D_{B2}$; and $D_{C1}$, $D_{C2}$ that comprise free-wheeling diodes or anti-parallel diodes to the respective switches (60, 61) in the primary active bridge 102. In the DC-to-DC converter 111 in one illustrative configuration, each diode 66 facilitates current dissipation associated with the respective switch (60, 61, 63, 64), to which the diode 66 is coupled in parallel, to reduce transient voltages across the switch (e.g., during a prior turn-off, prior deactivation or prior dead-time of the switch in preparation) for the next turning on of the switch, or next activating of the switch (60, 61, 63, 64). In one embodiment, the protective diodes 66 may be composed gallium nitride diodes or other semiconductor materials.

Secondary switches (63, 64) refer to semiconductor devices or transistors, comprising high-side switches $T_{a1}$, $T_{b1}$, $T_{c1}$ and low-side switches $T_{a2}$, $T_{b2}$, $T_{c2}$; where the first phase or phase A includes primary switches (60, 61), $T_{a1}$ and $T_{a2}$; the second phase or phase B includes primary switches (60, 61), $T_{b1}$ and $T_{b2}$; the third phase or phase C includes primary switches (60, 61), $T_{c1}$ and $T_{c2}$. The protection diodes 66 refer secondary diodes $D_{a1}$, $D_{a2}$; $D_{b1}$, $D_{b2}$; and $D_{c1}$, $D_{c2}$ that comprise free-wheeling diodes or anti-parallel diodes to the respective switches (60, 61) in the secondary active bridge 104.

In FIG. 1. $V_{in}$ is input voltage or primary voltage at the primary DC bus (83, 84) of primary active bridge 102 or primary converter; $V_{out}$ is the output voltage or secondary voltage at the secondary DC bus (85, 86) of the secondary active bridge or secondary converter.

In accordance with one embodiment, a system and method for controlling a direct-current-to-direct-current converter comprises a primary converter 102 coupled to a secondary converter 104 via a transformer 14 (e.g., high-frequency, isolating transformer). A primary voltage sensor 103 is configured to detect a primary direct current voltage; a secondary voltage sensor 105 is configured to detect a secondary direct current voltage for a sampling time interval. One or more secondary current sensors (48, 148, 248) are configured to detect corresponding respective secondary alternating current(s) at one or more corresponding secondary alternating current nodes (78, 80, 82) for the sampling time interval, where each of the secondary alternating current nodes (78, 80, 92) is associated with a corresponding phase of the secondary converter, such as first phase, a second phase or a third phase. An estimator 34 or electronic data processor 32 is configured to estimate an electromagnetic circuit inductance (e.g., leakage inductance) of the transformer for the sampling time interval based on a change per unit time in the detected secondary alternating current, the detected primary direct current voltage, and the detected secondary direct current voltage. The electronic data processor 32 is configured to determine a target power transfer between the primary converter 102 to the secondary converter 104 consistent with the estimated electromagnetic circuit inductance for the sampling time interval. A driver 35 is configured to adjust a phase offset of driver control signals, which are applied to control terminals (52, 55), between corresponding switches of the same phase of the primary converter 102 and the secondary converter 103 consistent with the target power transfer and the estimated electromagnetic circuit inductance (e.g., comprising a leakage inductance), to minimize thermal energy dissipated from the direct-current-to-direct current converter 111, or its transformer 14, for the sampling time interval, or for a series of successive sampling intervals.

In one embodiment, an electronic controller 38 comprises an electronic data processor 32, a data storage device 40, and one or more data ports 42 coupled to or in communication with a data bus 44. The electronic data processor 32, the data storage device 40, and one or more data ports 42 may communicate data messages between each other via the data bus 44.

The electronic data processor 32 comprises a microcontroller, a microprocessor, a programmable logic array, a logic device, an arithmetic logic unit, a digital signal processor, an application specific integrated circuit or another device for processing or manipulating data. The data storage device 40 comprises electronic memory, nonvolatile random-access memory, magnetic storage device, an optical storage device, or another device for storing, retrieving and managing data, files, data structures or data records. The data ports 42 may comprise an input/output port, a data transceiver, a wireline transceiver, a wireless transceiver, buffer memory, or a combination of the foregoing items.

In one embodiment, the electronic data processor 32 or its data ports 42 are connected to or in communication with the control terminals 55 of the switches (e.g., primary switches, 60, 61, and the secondary switches, 63, 64) of the primary full bridge 10 and the secondary full bridge 12. Accordingly, the electronic controller 38 can control the timing and operation of each switch, such as activation time, deactivation time, biasing and other aspects. In one embodiment, the electronic controller 38 or electronic data processor 32 uses a fixed switching frequency of fundamental frequency (e.g., within an operational range of switching frequencies). Further, the switches can operate with a same or substantially similar fixed duty cycle (e.g., 50 percent duty cycle plus or minus ten percent tolerance) for multiple or all modulation modes, such as the first mode, the second mode and the third mode. In some configurations, the peak magnitude and duration of the gate signal of the high-side switch (60, 63) and low-side switch (61, 64) of any pair or phase will generally be equal or substantially equivalent.

In one embodiment, an electronic controller 38 is configured to provide time-synchronized control signals with a phase offset to corresponding ones of control terminals (52, 55) of the primary switches (60, 61) and secondary switches (63, 64) to control the DC-DC converter or system 111 to operate at target phase offset (e.g., of a pulse width modulation) based on one or more of the following for one or more sampling intervals: (a) an observed primary DC voltage or an observed magnitude change versus time in primary DC voltage; an observed secondary DC voltage or an observed magnitude change versus time in secondary DC voltage, an observed AC current at one or more alternating current nodes (e.g., secondary AC nodes) of the dual active bridge converter, and a target power flow between the primary and secondary of the dual active bridge converter;

(b) an observed inductance or an observed leakage inductance estimated based on one or more of the following: an observed primary DC voltage, an observed secondary DC voltage, and an observed AC current at one or more alternating current nodes (e.g. secondary AC nodes) of the dual active bridge converter, or (c) an observed primary DC voltage, an observed secondary DC voltage, and an observed AC current at one or more alternating current nodes (e.g., primary AC nodes and secondary AC nodes) of the dual active bridge converter, and a target power flow between the primary and secondary of the dual active bridge converter; or (d) an observed inductance or an observed leakage inductance estimated based on one or more of the following: observed primary DC voltage, an observed secondary DC voltage, and an observed AC current at one or more alternating current nodes (e.g. primary AC nodes and secondary AC nodes) of the system 111 of the dual active bridge converter.

At a first DC voltage range, primary load or energy storage device is arranged for coupling to the primary direct current terminals (83, 84), where the primary load may comprise an inverter or an inverter coupled to an electric machine and where an energy storage device may comprise a battery, alone or in combination with a capacitor, such as an ultracapacitor or capacitor bank. At a second DC voltage range, a secondary load or energy storage device is arranged for coupling to the secondary direct current terminals (85, 86), where a secondary load may comprise an inverter or an inverter coupled to an electric machine and where an energy storage device may comprise a battery, alone or in combination with a capacitor, such as an ultracapacitor or capacitor bank. The first DC voltage range (e.g., 700 VDC plus or minus a tolerance, such as approximately ten percent) is different than the second DC voltage range (e.g., 48 VDC plus or minus a tolerance, such as approximately ten percent).

An estimator 34 or disturbance estimator 36 is configured to estimate an electromagnetic circuit inductance (e.g., leakage inductance) of the transformer for the sampling time interval based on a change per unit time in the detected secondary alternating current, the detected primary direct current voltage, and the detected secondary direct current voltage.

An electronic data processor 32 is configured to determine a target power transfer between the primary converter to the secondary converter consistent with the estimated electromagnetic circuit inductance for the sampling time interval.

In one embodiment, a driver 35 or driver module may comprise a software module, an electronic module, or both. The driver 35 is configured to adjust a phase offset of driver control signals between corresponding switches of the same phase of the primary converter and the secondary converter consistent with the target power transfer and the estimated electromagnetic circuit inductance (e.g., comprising a leakage inductance), to minimize thermal energy dissipated from the direct-current-to-direct current converter or its transformer for the sampling time interval.

In one embodiment, a primary alternating-current detector is configured to detect a respective primary alternating current at one or more corresponding primary alternating current nodes for the sampling time interval, where each of the primary alternating current nodes is associated with a corresponding phase of the secondary primary.

The estimator (34, 36) is configured to estimate the electromagnetic circuit inductance (e.g., leakage inductance), series inductance current or change in series inductance current of the transformer for the sampling time interval based on a change per unit time in the detected primary alternating current, in the detected secondary alternating current, or in both the primary and secondary alternating currents; the detected primary direct current voltage, and the detected secondary direct current voltage.

A disturbance estimator 36 or observer module may comprise software instructions that are stored in the data storage device, where the electronic data processor is configured to execute or run the software instructions. The disturbance estimator 36 or observer module may operate in accordance with various examples, which may be applied separately or cumulatively.

Under a first example, a disturbance estimator 36 or observer module is configured to detect a first transient variation in the primary direct current voltage based on a first change in load on the primary direct current terminals, wherein an inverter is coupled to the direct current terminals to drive an electric machine in a motoring mode to propel a vehicle.

Under a second example, the disturbance estimator 36 or the observer is configured to detect a second transient variation in the secondary direct current voltage based on a second change in load on the secondary direct current terminals.

Under a third example, during the sampling interval, a disturbance estimator 36 or an observer is configured to determine whether or not the estimated electromagnetic circuit inductance is saturated based on a drop of the detected primary direct current voltage by at least a first threshold to trigger the adjusting of the phase offset to protect the switches in the secondary converter.

Under a fourth example, during the sampling interval, a disturbance estimator 36 or an observer is configured to determine whether or not the estimated electromagnetic circuit inductance is saturated based a change in the alternating current versus time (e.g., change in slope), associated with the estimated electromagnetic circuit inductance, that exceeds a second threshold to trigger the adjusting of the phase offset to protect the switches in the secondary converter.

Under a fifth example, during the sampling interval, a disturbance estimator 36 or an observer is configured to determine whether or not the estimated electromagnetic circuit inductance is saturated based on based on: (a) a drop of the detected primary direct current voltage by at least a first threshold to trigger the adjusting of the phase offset to protect the switches in the secondary converter and (b) a change in the alternating current versus time (e.g., change in slope), associated with the estimated electromagnetic circuit inductance, that exceeds a second threshold to trigger the adjusting of the phase offset to protect the switches in the secondary converter.

Figure 2:
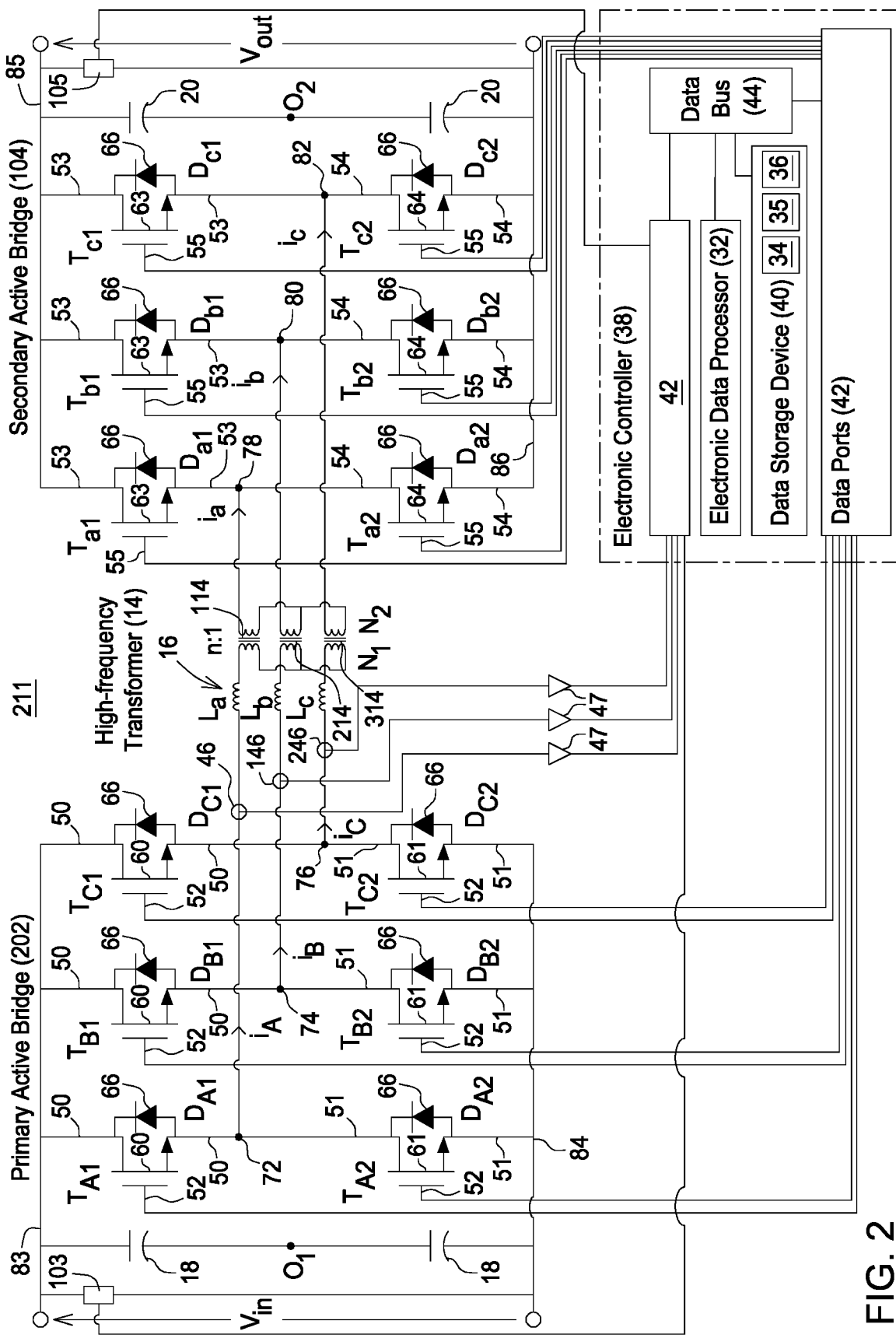
FIG. 2 is a schematic diagram of a second embodiment of a three-phase, dual active bridge, direct-current-to-direct-current-converter that comprises a primary active bridge converter coupled to a secondary active bridge converter via a transformer.

The system 111 of DC-to-DC converter of FIG. 2 is similar to FIG. 1, except the system 211 further comprises primary current sensors (46, 146, 246) and deletes the secondary current sensors (48, 148, 248). The primary current sensor 46 measures the first phase or phase A alternating current at the first AC node 72; the primary current sensor 146 measures the second phase or phase B alternating current at the second AC node 74; the primary current sensor 246 measures the third phase or phase C alternating current at the third AC node 76. As in FIG. 1, each current sensor may be associated with a corresponding signal interface module 49 that scales, amplifies or attenuates the measured current and/or converts the measured current from an analog measured current to a digital measured current value. The scaling module comprises any of the following: a resistive voltage divider, an amplifier, and/or analog-to-digital converter. For any phase, among the first phase, the second phase and third phase, the primary current at an primary AC node (72, 74, 76) and secondary current at a corresponding secondary AC node (78, 80, 82) are directly proportional to each other consistent with the transformer turn-ratio (n:1) of transformer 14 if the magnetizing current of isolation transformer is negligibly small.

Figure 3:
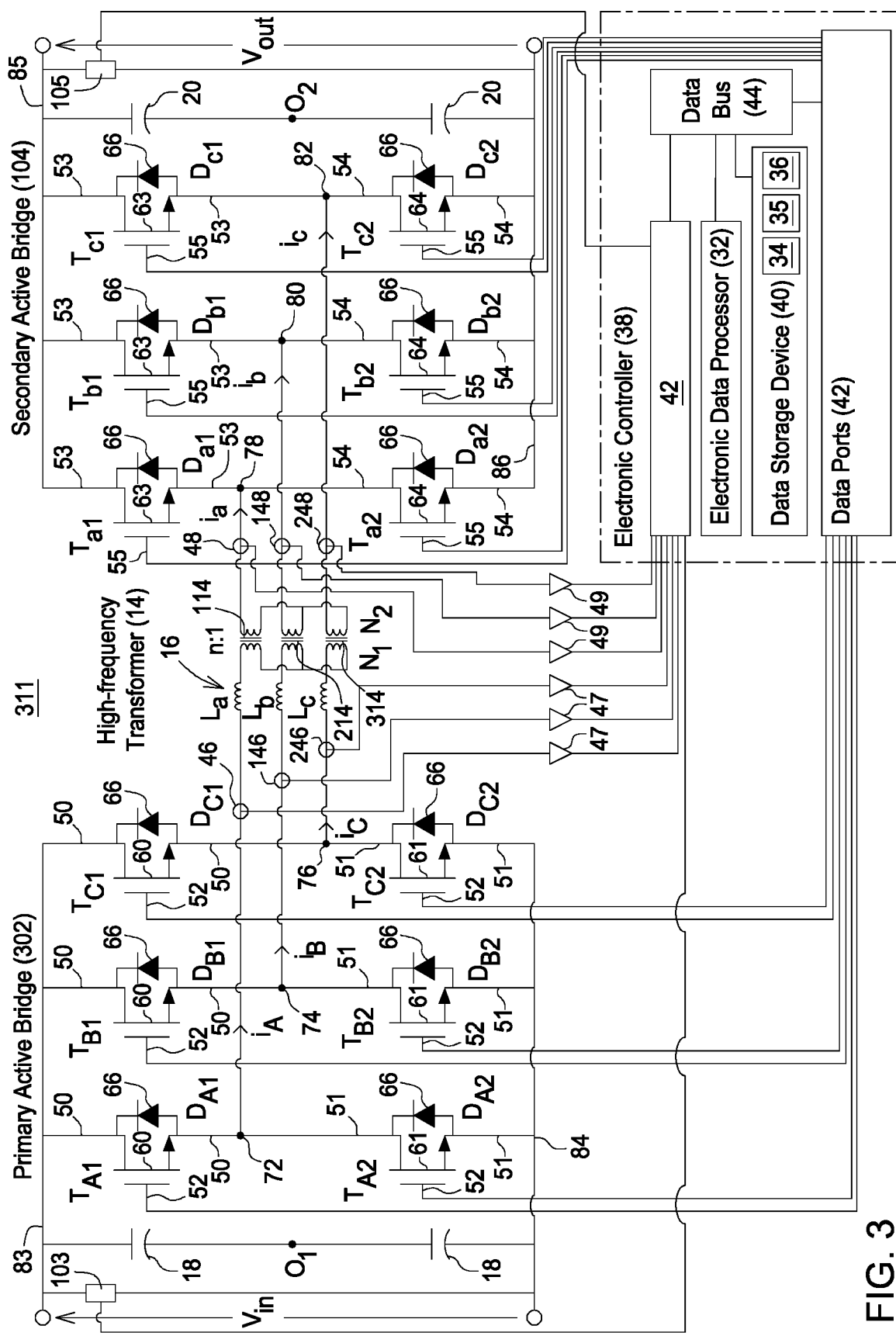
FIG. 3 is a schematic diagram of a third embodiment of a three-phase, dual active bridge, direct-current-to-direct-current-converter that comprises a primary active bridge converter coupled to a secondary active bridge converter via a transformer.
Figure 4:
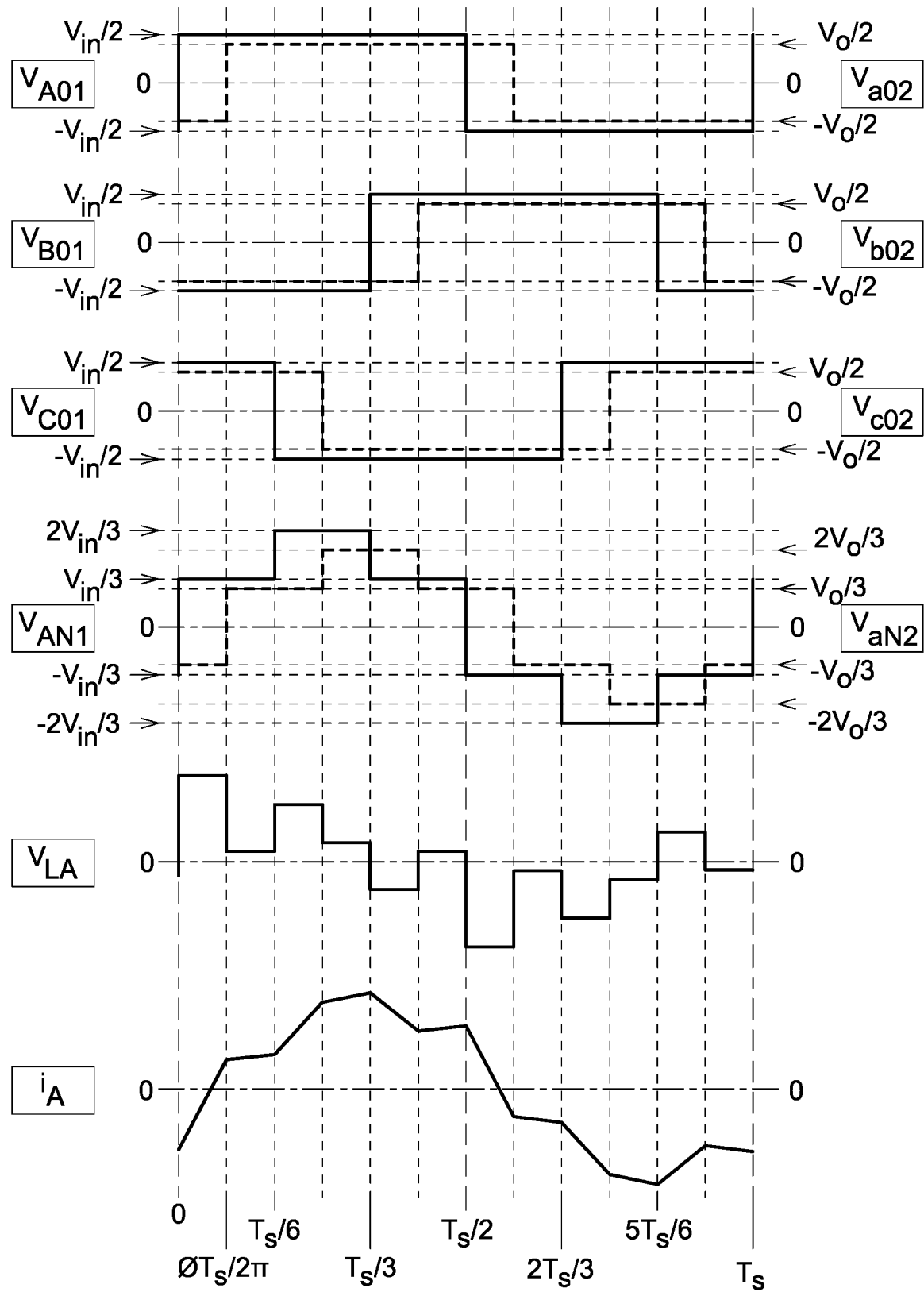
FIG. 4 shows the phase offset, signal magnitude and timing of the control signals applied to the (same) phases of the primary active bridge converter and the second active bridge converter, where signal magnitude is on each vertical axis and where time is a common horizontal axis.

The system 111 of DC-to-DC converter of FIG. 3 is similar to FIG. 1, except the system 211 further comprises primary current sensors (46, 146, 246) together with the secondary current sensors (48, 148, 248) of FIG. 1. The primary current sensor 46 measures the first phase or phase A alternating current at the first AC node 72; the primary current sensor 146 measures the second phase or phase B alternating current at the second AC node 74; the primary current sensor 246 measures the third phase or phase C alternating current at the third AC node 76. As in FIG. 1, each current sensor may be associated with a corresponding signal interface module 49 that scales, amplifies or attenuates the measured current and/or converts the measured current from an analog measured current to a digital measured current value. The scaling module comprises any of the following: a resistive voltage divider, an amplifier, and/or analog-to-digital converter. For any phase, among the first phase, the second phase and third phase, the primary current at an primary AC node (72, 74, 76) and secondary current at a corresponding secondary AC node (78, 80, 82) are directly proportional to each other consistent with the transformer turn-ratio (n:1) of transformer 14 if the magnetizing current of isolation transformer is negligibly small FIG. 4 illustrates the possible operational waveforms of the three-phase dual active bridge (DAB3) or DC-to-DC converter (111, 211, 311) of any of the embodiments of FIG. 1 through FIG. 3. In FIG. 4, the vertical axis represents magnitude of the signal or waveform, whereas the horizontal axis indicates time or a common reference time-line for each graph.

As indicated in FIG. 4, the electronic controller 38 or driver 35 is configured to control or switch the semiconductor switches (60, 61) (via control terminals 55) of the corresponding primary active bridge 102 to provide or impose AC pole-voltages ($V_{AO_1}$, $V_{BO_1}$, $V_{CO_1}$), such as square-waves that oscillate about the zero magnitude level voltage, at the primary AC nodes (72, 74, 76); further, the electronic controller 38 or driver 35 is configured to control or switch the semiconductor switches (63, 64) of the corresponding secondary active bridge 104 to provide or impose AC pole-voltages ($V_{aO_2}$, $V_{bO_2}$, and $V_{cO_2}$), such as square-waves, at the secondary AC nodes (78, 80, 82) where each AC voltage is expressed in magnitude in volts versus time. Here, $V_{AO_1}$, $V_{BO_1}$, and $V_{CO_1}$ may comprise mid-point (pole) AC voltages, which are measured or observed with respect to the mid-point ($O_1$) of primary DC bus (83, 84) of the primary active bridge 102; as illustrated in FIG. 4. $V_{AO_1}$, $V_{BO_1}$, and $V_{CO_1}$ are aligned with the magnitude of zero volts on the vertical axes. Similarly, $V_{aO_2}$, $V_{bO_2}$, and $V_{cO_2}$ may comprise mid-point (pole) AC voltages, which are measured or observed with respect to the mid-point ($O_2$) of secondary DC bus (85, 86) of the secondary active bridge mid-point (pole) voltage in the secondary active bridge 104; as illustrated in FIG. 4, $V_{aO_2}$, $V_{bO_2}$, and $V_{cO_2}$ are aligned with the magnitude of zero volts on the vertical axes.

$V_{AN_1}$ is one possible illustrative waveform of the primary AC voltage of the first phase or phase A of the primary active bridge 102 where the AC voltage is expressed in magnitude in volts versus time. Similarly, $V_{BN_1}$ is the primary AC voltage of the second phase or phase B of the primary active bridge 102; and $V_{CN_1}$ is the primary AC voltage of the third phase or phase C of the primary active bridge 102. The electrical waveforms for $V_{BN_1}$ and $V_{CN_1}$ are not shown in FIG. 4, but are similar to the $V_{AN_1}$ primary AC voltage, with a phase offset, such as approximately 120 degrees or 240 degrees, respectively, with respect to the first phase $V_{AN_1}$.

$V_{aN_2}$ is one possible illustrative waveform of secondary AC voltage of the first phase or phase "a" of the secondary active bridge 104, where the AC voltage is expressed in magnitude in volts versus time. Similarly, $V_{bN_2}$ is the secondary AC voltage of the second phase or phase "b" of the secondary active bridge 104 and $V_{cN_2}$ is the secondary AC voltage or the third phase or phase "c" of the secondary active bridge 104. The electrical waveforms for $V_{bN_2}$ and $V_{cN_2}$ are not shown in FIG. 4, but are similar to the $V_{aN_2}$ secondary AC voltage, with a phase offset, such as approximately 120 degrees or 240 degrees, respectively, with respect to the first phase $V_{aN_2}$.

In FIG. 4, $V_{L_A}$ is one possible illustrative waveform or the AC voltage (e.g., switching voltage) imposed across the first effective inductance (combination of physical inductance and leakage inductance) of the transformer 14 in the phase-A magnetic circuit between primary and secondary active bridges. For example, the magnetic circuit for any phase may comprise electromagnetic components of the primary winding, the secondary winding, and the core (e.g., iron core or ferrite core), such as the winding configurations, number of turns, and magnetic permeability of the core, among other factors. Meanwhile, $i_A$ is the one possible illustrative waveform of the magnitude versus time of AC current in the primary winding of the first phase or phase A of the transformer 14.

Similarly, $V_{L_B}$ is one possible illustrative waveform of magnitude versus time or the AC voltage (e.g., AC switching voltage) imposed across effective inductance (combination of physical inductance and leakage inductance) of the transformer 14 in the phase-B magnetic circuit between the primary active bridge 102 and secondary active bridge 104; $V_{L_C}$ is one possible illustrative waveform or the AC switching voltage imposed across effective inductance (combination of physical inductance and leakage inductance) in the phase-C magnetic circuit between the primary active bridge 102 and secondary active bridge 104. The electrical waveforms for $V_{L_B}$ and $V_{L_C}$ are not shown in FIG. 2.

For power flow in DC-to-DC converter, the electronic controller 38, the driver 35 or the electronic data processor 32, is configured to use a phase-shift control technique to energy transfer (e.g., control volt-second-per turn, VoT, to achieve maximum magnetic flux, where Vo is the output or secondary AC voltage of a transformer 14 and T is the period or inverse of switching frequency) transfer in the magnetic circuit for each respective phase between each primary winding and secondary winding of the transformer 14. The effect of magnetic circuit can be modeled by the effective inductance (e.g., virtual or modeled inductance representing a combination of physical and leakage inductance) in the magnetic circuit between primary active bridge 102 and secondary active bridge 104 for one or more phases. FIG. 1 illustrates a discrete inductor or leakage inductance (116, 216, 316) of the primary winding (114, 214, 314) per phase. For example, the discrete inductor or leakage inductance symbols (116, 216, 316) can be represented as $L_A$, $L_B$ and $L_C$ for phases A, B and C, respectively.

Equation set 1 states active power flow (P) between both the primary active bridge (e.g., 102) and the secondary active bridge (e.g. 104) as follows:

$$P = \frac{V_{in}^2 D}{2\pi f_s L} \phi \left(\frac{2}{3} - \frac{\phi}{2\pi}\right), 0 \leq \phi \leq \frac{\pi}{3} \quad (1)$$

$$P = \frac{V_{in}^2 D}{2\pi f_s L} \left(\phi - \frac{\phi^2}{\pi} - \frac{\pi}{18}\right), \frac{\pi}{3} \leq \phi \leq \frac{\pi}{2}$$

where D is the duty cycle of switches ($T_{A1}$, $T_{A2}$, $T_{B1}$, $T_{B2}$, $T_{C1}$, $T_{C2}$, $T_{a1}$, $T_{a2}$, $T_{b1}$, $T_{b2}$, $T_{c1}$, and $T_{c2}$) of the primary active bridge 102 and secondary active bridge, where D is between 0 and 1; $V_{in}$ is the DC voltage input or primary DC voltage as the primary active bridge 102; $f_s$ is the switching frequency (e.g., fundamental switching frequency in Hertz) that the driver 35 applies to the semiconductor switches (60, 61, 63, 64); Ø is the phase shift (e.g., in radians) between a primary switch and corresponding secondary switch of the same phase, such as a first phase or a second phase, and L is the effective inductance (e.g., in Henries) of the first phase, the second phase, or the third phase, or the aggregate inductance of all three phases.

For phase-shift control method of the DC-to-DC converter, the duty cycle D may be defined a ratio of pulse durations to the total time period or the ratio of the pulse duration to the pulse period of periodic pulse train. The duty cycle can have a possible value between zero and 1; however, for the primary active bridge 102 or the secondary active bridge 104, in practice the duty cycle has a typical maximum duty cycle (D) of 0.5 or 50% if dead-time between any high-side switch and respective low-side switch is ignored in both active bridges (102, 104). The electronic controller 38, driver 35 or data processor is configured to control the power flow between the primary active bridge 102 and the secondary active bridge 104 by varying one or more of the following: (a) duty (D) of switching devices ($T_{A1}$, $T_{A2}$, $T_{B1}$, $T_{B2}$, $T_{C1}$, $T_{C2}$, $T_{a1}$, $T_{a2}$, $T_{b1}$, $T_{b2}$, $T_{c1}$, and $T_{c2}$), within permitted design limits between a minimum duty cycle and maximum duty cycle, and (b) the phase shift, Ø, between a respective first switch (60,61) of corresponding phase (e.g., phase A) of the primary active bridge 102 and a respective second switch (63, 64) of the same phase (e.g., phase A) of the secondary active bridge 104.

For the phase-shift control method of DC-to-DC converter (e.g., 111, 211, 311), in one embodiment, the duty cycle (D) can be set to equal to the below relationship for a transformer in the following Equation (2):

$$D = \frac{nV_{out}}{V_{in}} \quad (2)$$

where, n is turn ratio of transformer 14 between a respective number of turns of the primary winding and a corresponding number of turns of the secondary winding of the transformer 14; where D is duty cycle of switching devices ($T_{A1}$, $T_{A2}$, $T_{B1}$, $T_{B2}$, $T_{C1}$, $T_{C2}$, $T_{a1}$, $T_{a2}$, $T_{b1}$, $T_{b2}$, $T_{c1}$, and $T_{c2}$) of primary active bridge 102 and secondary active bridge 104 for the phase-shift control method of DC-to-DC converter (e.g., 111, 211, 311), Vow is the secondary DC voltage level as the second DC bus (85,86), and $V_{in}$ is the primary DC voltage level of the primary DC voltage bus (83, 84) for the DC-to-DC converter.

By substituting duty (D) in Equation 1, power equation becomes as stated in Equation 3.

$$P = \frac{nV_{in}V_{out}}{2\pi f_s L} \phi \left(\frac{2}{3} - \frac{\phi}{2\pi}\right), 0 \leq \phi \leq \frac{\pi}{3} \quad (3)$$

$$P = \frac{nV_{in}V_{out}}{2\pi f_s L} \left(\phi - \frac{\phi^2}{\pi} - \frac{\pi}{18}\right), \frac{\pi}{3} \leq \phi \leq \frac{\pi}{2}$$

where, n is turn ratio of transformer 14 between a respective number of turns of the primary winding and a corresponding number of turns of the secondary winding of the transformer 14; Vow is the secondary DC voltage level as the second DC bus (85,86), and $V_{in}$ is the primary DC voltage level of the primary DC voltage bus (83, 84) for the DC-to-DC converter $f_s$ is the switching frequency (e.g., fundamental switching frequency in Hertz) that the driver 35 applies to the semiconductor switches (60, 61, 63, 64); Ø is the phase shift or phase shift offset (e.g., in radians) between a primary switch and corresponding secondary switch of the same phase, such as a first phase or a second phase, and L is the effective inductance (e.g., in Henries) of the first phase, the second phase, or the third phase, or the aggregate inductance of all three phases.

As stated in Equation (3), the active power (P) between primary active bridge 102 and secondary bridge 104 is a function of phase-shift angle (Ø) or phase shift offset angle ($Ø_{delta}$) between voltages (e.g., pole-voltages or switched voltages) at the corresponding primary AC node and respective AC node for each phase. For example, the phase shift offset or phase shift angle (Ø) equals a phase shift delta angle ($Ø_{delta}$) plus a default phase shift angle ($Ø_{default}$), where $Ø_{default}$ is theoretically, approximately 90 degrees, plus or minus a tolerance of ten percent, if the primary winding and the secondary winding configuration of the transformer 14 are wound in-phase and are not wound with an additional approximately 180 degrees offset, where $Ø_{delta}$ may vary with the switching frequency, the leakage inductance, the core losses, primary winding impedance, secondary winding impedance of the transformer 14, among other factors. The electronic controller 38, the electronic data processor 32 or the driver 35 is configured to generate control signals applied to control terminals 55 of the primary switches (60, 61) and secondary switches (63, 64) with a phase shift offset (Ø) to generate a pair of primary and secondary AC voltages with a phase shift offset, (Ø) where: $V_{AO_1}$ and $V_{aO_2}$ of the first phase or phase A have a phase shift offset, (Ø); $V_{BO_1}$ and $V_{bO_2}$ of the second phase or phase B have a phase shift offset and $V_{CO_1}$ and $V_{cO_2}$ of the third phase or phase C have a phase-shift offset (Ø). Usually, input DC voltage ($V_{in}$) at primary active bridge 102 and output DC voltage ($V_{out}$) at secondary active bridge 104 are kept within a regulated voltage range (e.g., at operating point) and the series inductance (L) (e.g., physical and/or leakage inductance in the primary winding) of the transformer 14 is assumed constant. The transformer 14 provides some provide galvanic isolation between primary active bridge 102 and secondary active bridge 104. In one embodiment, the series inductance comprises a discrete inductor plus a leakage inductance in the primary winding. In an alternate embodiment, the inductance comprises a leakage inductance that is susceptible to elevated level of magnetomotive force (MMF) in the magnetic circuit of one or more transformer phases; particularly where the transformer or DC-to-DC converter is exposed to an elevated load. The reduction in the ability of leakage inductance to function properly under high power flow between both bridges of the DC-to-DC converter, can result in an elevated AC current of the primary active bridge 102. Consistent with the embodiment of the system 111 of FIG. 1, AC current of the secondary active bridge 104 is amplified by a factor of transformer turn ratio (n), which can to current inrush on the secondary side of the DC-to-DC converter (FIG. 1). The turn ratio can be approximately 10 to 20 in a typical DC-to-DC converter that is designed for 700V (nominal) to 56 V (nominal) power conversion.

In some industrial applications, it is possible that: (a) the primary DC bus voltage (at primary DC bus terminals 83, 84) of the primary active bridge 102 and/or (b) the secondary DC bus voltage (at secondary DC bus terminals 85, 86) could vary by a design limit or maximum percentage (e.g., approximately twenty percent to approximately thirty percent, plus or minus a ten percent tolerance) with respect to a target operational voltage. The sag or swell in the primary DC bus voltage or the secondary DC bus voltage with respect to the target operational voltage can occur during transients or changes in loads or devices coupled to the primary DC terminals (83, 84) or secondary DC terminals (85, 86) of the DC-to-DC converter 111, where the transients or changes in load of the DC-to-DC converter 111 may be associated with a vehicle that is traveling up or down a slope in the ground, shifting gears of a transmission, lifting, moving, digging, dumping, sawing, or cutting physical objects, or performing other work tasks. Accordingly, the voltage sensors (103, 105) are well-suited for detecting material or significant transients or changes in load or attendant variation in the primary DC bus voltage, the secondary DC bus voltage. Meanwhile, the current sensors (e.g., 48, 148, 248) are well-suited for detecting material or significant transients or changes in load or attendant variation in primary AC current or secondary AC current. For any phase, among the first phase, the second phase and third phase, the primary current at an primary AC node (72, 74, 76) and secondary current at a corresponding secondary AC node (78, 80, 82) are directly proportional to each other consistent with the transformer turn-ratio (n:1) of transformer 14 if the magnetizing current of isolation transformer is negligibly small.

Further, the electronic controller can compensate for such transients or such variations in voltage and/or current by an adjustment to phase shift offset or phase shift delta, an adjustment to duty cycle, or both phase shift and duty cycle adjustments of the DC-to-DC converter 111. For example, consistent with equation 3 at a given load power (P), the electronic controller, electronic data processor or driver 35 is configured to control the DC-to-DC converter by varying phase-shift angle (Ø) between pairs of voltages at primary AC node (72, 74, 76) and respective secondary AC node (78, 80, 82) (e.g., switching voltages or pole-voltages), while $V_{in}$ and $V_{out}$ are actual values of voltages measured at DC bus of the primary active bridge 102 and secondary bridge 104. The inductance L (series inductance in equation 3) can be stored as a parameter value (e.g., which is constant or which varies with electrical and thermal conditions), frequency-dependent values, primary or secondary DC voltage-dependent values, primary or secondary AC current dependent values, and/or temperature-dependent values in a look-up table, inverted file, data base, or other record storable in the data storage device 40.

In one example of operating the DC-to-DC converter, if $V_{in}$ declines below 700V and if $V_{out}$ is at 60V output voltage, power flow from primary active bridge 102 is met by raising the root mean square (RMS) value of the input currents at the primary AC nodes (72, 74, 76). In FIG. 1, the primary input currents are denoted $i_A$ for phase A, $i_B$ for phase B, and $i_C$ for phase C. Under elevated values of $i_A$, $i_B$, $i_C$ series inductances $L_A$, $L_B$ and $L_C$ (116, 216, 316) of transformer 14 could saturate, resulting in values of the currents ($i_A$, $i_B$, and $i_C$) that exceed a target design current limit. Hence, the electronic controller 38, electronic data processor, 32 or driver 35 is configured to adjust the duty cycle and/or phase shift offset align (e.g., temporarily reduce or attenuate for one or more sampling intervals in which transient excess current would otherwise occur) the power flow of Equation 3 with proper non-saturated AC current levels for the series inductances at the primary AC nodes (72, 74, 76).

Figure 5:
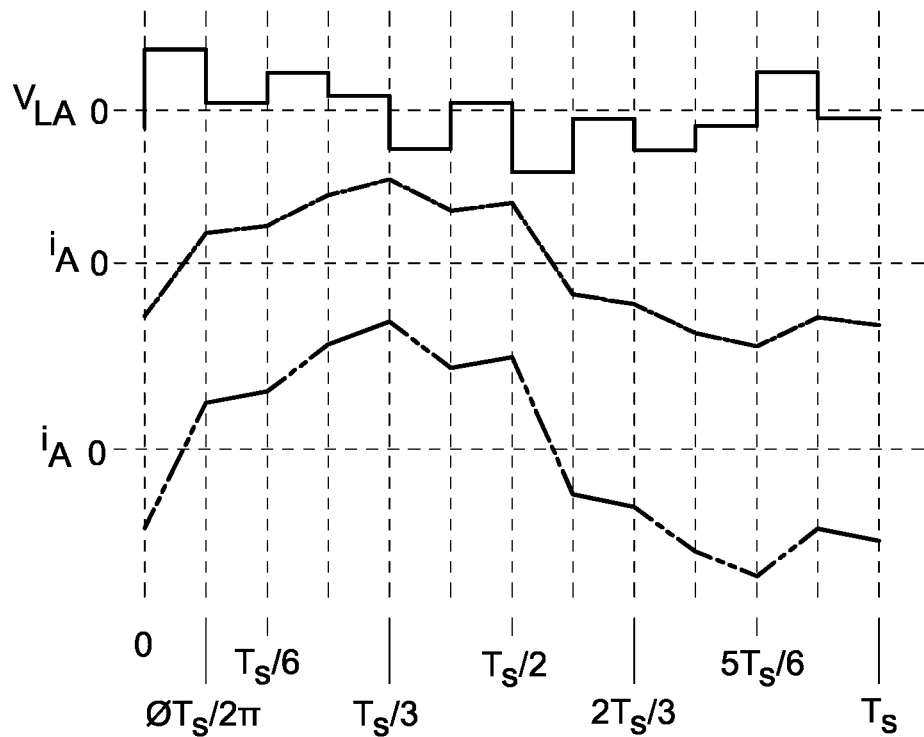
FIG. 5 shows the output waveform, expressed as current versus time, at the transformer under normal inductance and saturated inductance, which may vary with load applied to the primary terminals and/or secondary terminals.

FIG. 5 illustrates one possible normal operating condition (of middle waveform in sold lines) compared to saturated condition (of lower waveform in alternating solid and dashed lines) under current saturation of series inductance of the magnetic circuit of the transformer 14 between primary active bridge 102 and secondary active bridge 104 of DC-to-DC converter 111. FIG. 5 illustrates signal magnitude on the vertical axes relative to the DC or middle point of the primary DC bus or secondary DC bus, whereas time is illustrated on the horizontal axis, such as over a period (Ts) that is inversely proportional to the switching frequency of the switches (60, 61, 63, 64). Each vertical dashed line is equal to approximately Ts/12 or approximately 30 degrees of a full 360 cycle of a period (Ts).

As shown in FIG. 5, the slope of inductor current, phase A current, or first phase current at the primary node 72 is associated as a constant slope for each Ts/12 time interval. The output current from primary active bridge 102 can change when series inductance 116 becomes saturated with excess current, for example. In one embodiment, in FIG. 2 a current sensor 46 (e.g., high bandwidth current sensor) at AC output node 72 of primary active bridge 202 is configured to the AC current ($I_A$) or to detect the change per unit time or current slope of the AC current ($I_A$) under a given operating condition.

In FIG. 5 at each 30 ($T_s/12$) degree interval of the waveform, the slope of AC current changes at a pre-identified rate consistent with middle waveform (shown in solid lines or solid line segments) in FIG. 5. However, if the series inductance 116 becomes saturated with excess current (e.g., during a transient over-current state), the normal current slope of the middle waveform becomes the saturated current slope (e.g., steeper saturated current slope) of the lower waveform (shown in alternating solid and dashed lines). Therefore, if the DC-to-DC converter (111, 211, 311) is switched at 100 kHz, the detection time for the increased or steeper current slope is generally less than 2 microseconds. Further, once the electronic controller 38, or electronic data processor 32 detects the steeper slope during a sampling interval from an observed current sensor reading of the current sensor (46, 146, 246, 48,148, 248) and/or a voltage sensors (193, 105), then the electronic controller 38, electronic data processor or driver 35 electronic is configured to adjust the offset phase angle.

In one embodiment, the AC current (e.g., series inductance current) at the primary AC node is function of $V_{in}$ and $V_{out}$ where the above voltages are measured by voltage sensors (103, 105), and used to determine the rate of change of inductor current during each 30°

$$\left(=\frac{T_S}{12}\right)$$

interval of the waveform of FIG. 5. Further, the determined rate of change of inductor current is compared against measured current from sensor installed at AC outputs of primary bridge in the DC-to-DC converter. Any significant discrepancy between the determined rates (measured and determined), particularly observed at load above 90%, are indicative of deviation in current that needs to be adjusted with a compensating phase shift to compensate for potential or actual saturation of the leakage inductance or series inductance of the magnetic circuit of one or more transformer phases.

Recall Equation set 3 provides the following:

$$P = \frac{nV_{in}V_{out}}{2\pi f_s L} \phi \left( \frac{2}{3} - \frac{\phi}{2\pi} \right), \ 0 \leq \phi \leq \frac{\pi}{3}$$

$$P = \frac{nV_{in}V_{out}}{2\pi f_s L} \left( \phi - \frac{\phi^2}{\pi} - \frac{\pi}{18} \right), \ \frac{\pi}{3} \leq \phi \leq \frac{\pi}{2}$$

(3)

Once the rate of change of the determined and measured AC current are indicative of a material discrepancy during any sampling interval (e.g., during each 30°

$$\left( = \frac{T_S}{12} \right)$$

interval) of the AC current waveform of the primary AC node of FIG. 5, the electronic controller 38, electronic data processor 32 or the driver 35 is configured to control or adjust the offset phase angle (Ø) to get proper value of power-flow, which, in turn, will instantaneously adjust or suppress inductor current, which would otherwise tend to expose one or more switching devices in secondary active bridge to a potential or actual current inrush or transient current that exceeds desired current level. The instantaneous reduction, suppression or amelioration in inrush current will address any potentially abnormal value of $$L_{dc} \frac{i_{dc}}{dt},$$

where $L_{dc}$ is the secondary DC bus inductance of secondary active bridge 104, which needs to be under 2 nH for certain load level on the secondary DC terminals (85, 86) (e.g., 15 kW loading and $i_{dc}$ is accumulative value of DC bus current flowing into switching devices in the secondary active bridges 104). The adjustable value phase angle (Ø) of control signals applied to control terminals 55 of the switches (60, 61, 63, 64) will suppress value of $$L_{dc} \frac{i_{dc}}{dt}$$

that might otherwise occur in the absence of phase angle shift; hence, results in elimination of voltage stress and potentially increased longevity of the switches (60, 61, 63, 64).

Figure 6:
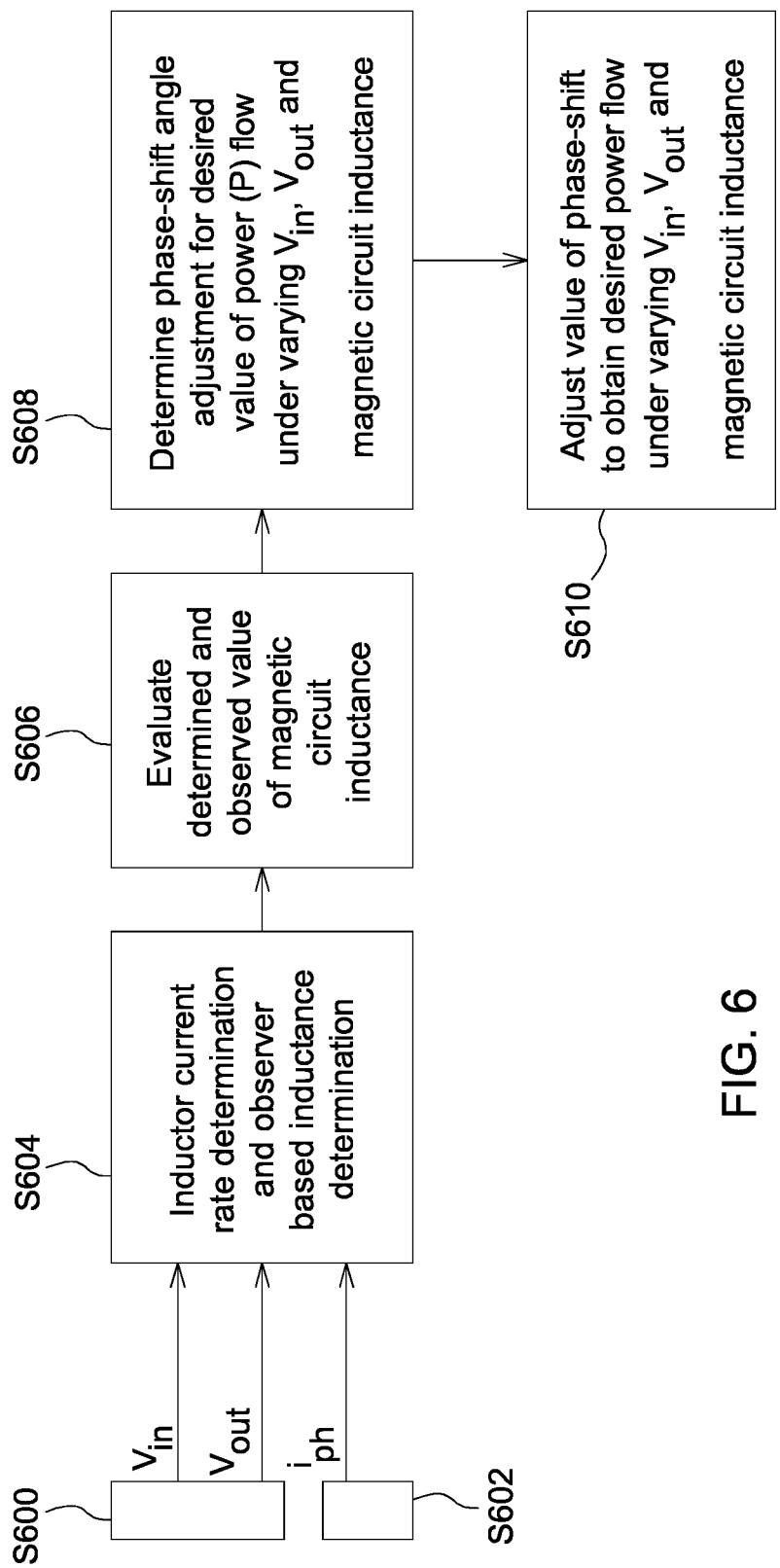
FIG. 6 is a block diagram of the control modules that adjust the relative phase shift between the primary active bridge converter and the secondary active bridge converter based on the primary DC voltage, the secondary DC voltage and AC current observed at the primary or secondary of the transformer.

FIG. 6 illustrates a flow chart of a control method for the DC-to-DC converter to prevent potential voltage or current stress on components of the DC-to-DC converter to promote longevity of such components, such as switches. The control method of FIG. 6 begins in step S600.

In step S600, voltage sensors (103, 105) are configured to detect a primary direct current (DC) voltage and a secondary direct current (DC) voltage for a sampling time interval.

In step S602, one or more current sensors (48, 148, 248) are configured to detect a respective alternating current (AC) current at one or more AC current nodes (e.g., secondary alternating current (AC) at one or more corresponding secondary alternating current nodes) for the sampling time interval. For example, one or more current sensors (48, 148, 248) are configured to detect a respective secondary alternating current (AC) at one or more corresponding secondary alternating current nodes) for the sampling time interval, where each of the secondary alternating current nodes is associated with a corresponding phase of the secondary converter (104, 204).

In step S604, an estimator (34, 36), observer or electronic data processor 32 is configured to estimate any of the following: (a) an electromagnetic circuit inductance (e.g., leakage inductance or series inductance) of the transformer 14, (b) an AC current at a primary AC node or secondary AC node associated with the transformer 14 (e.g., of leakage inductance or sires inductance of the transformer), or (c) an inductor current rate (e.g., change in current versus time) for the sampling time interval based on one or more of the following: a change per unit time in the detected secondary alternating current, the detected primary direct current voltage, and the detected secondary direct current voltage.

In step S606, the electronic data processor 32 or electronic controller 38 is configured to determine whether there is material or significant discrepancy between a normal slope and an increased slope of an inductor current rate that is determined by voltage measurements of the voltage sensors (103, 105) and observed by one or more current sensors (46, 146, 246, 48, 148, 248), wherein the material or significant discrepancy meets or exceeds a triggering threshold for transient current compensation/phase angle adjustment.

In step S608, the electronic data processor 32 or an electronic controller 38 is configured to determine a phase shift (e.g., offset phase shift angle) for a respective target power transfer between the primary converter to the secondary converter consistent with any of the following: (a) the estimated electromagnetic circuit inductance of one or more phases of a transformer 14, (b) estimated AC current at a respective AC current node for the sampling time interval, (c) observed voltage measurement at the primary DC bus terminals and/or secondary DC bus terminals. For example, the electronic data processor or the electronic controller is configured to determine and apply a phase shift offset to control terminals of the switches based on the material discrepancy exceeding a triggering threshold for transient current compensation/phase angle adjustment.

In step S610, an electronic controller, an electronic data processor or a driver 35 is configured to adjust a phase offset of driver control signals between corresponding switches of the same phase of the primary converter and the secondary converter consistent with the target power transfer and the estimated electromagnetic circuit inductance (e.g., comprising a leakage inductance), to minimize thermal energy dissipated from the direct-current-to-direct current converter or its transformer for the sampling time interval.

Figure 7:
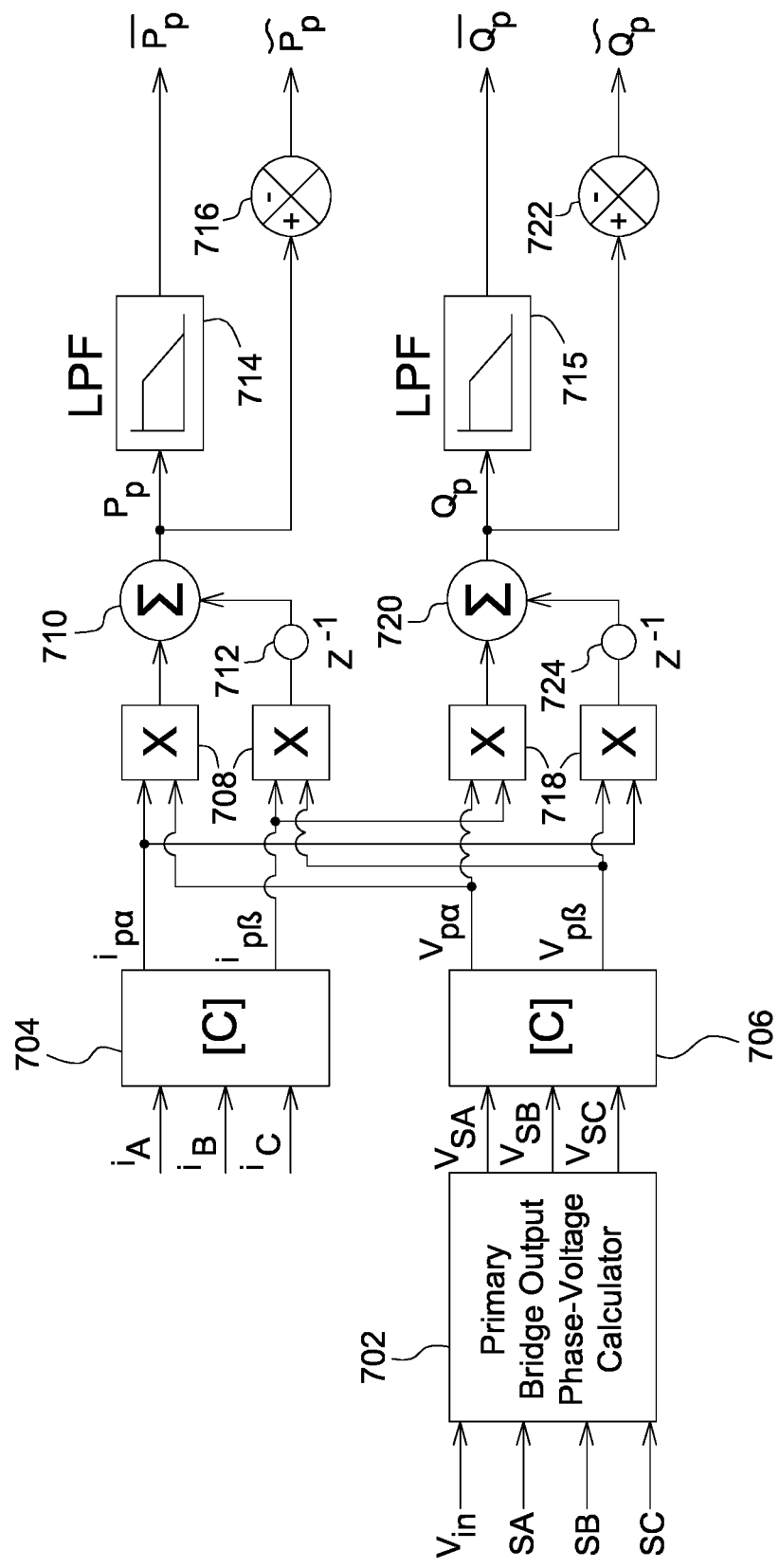
FIG. 7 is a block diagram of an electronic module or software module for determining static and dynamic real and reactive power at the output of the primary active bridge.

FIG. 7 is a block diagram of an electronic module or software module for determining static and dynamic real and reactive power at the output of the primary active bridge. The electronic controller 38 or the electronic data processor 32 may be configured to execute or run the primary power estimation software module of FIG. 7, where the software module may be stored in the data storage device.

In block 702, the primary bridge output phase-voltage calculator determines the AC primary voltage for the phase A, $V_{SA}$; the AC primary voltage for phase B, $V_{SB}$; and the AC primary voltage for phase C, $V_{SC}$; which may be expressed as root mean squared primary voltage in accordance with the following equations:

$$V_{SA} = (V_{in}/3) \times (2SA - SB - SC), V_{SB} = (V_{in}/3) \times$$
$$(-SA + 2SB - SC), \text{ and } V_{SC} = (V_{in}/3) \times (-SA - SB + 2SC);$$

where Vin is the primary DC voltage at the primary DC voltage terminals (83, 84), which can be measured by voltage sensor 103, and where SA, SB and SC are primary coefficients for the primary phase A, phase B, and phase C components of the primary AC voltage or primary AC voltages $V_{SA}$, $V_{SB}$ and $V_{SC}$.

In FIG. 7, in transform 704 "[C]" is the transformation matrix (Clarke Transformation) applied to transform three-phase (e.g., abc-coordinate) quantities (e.g., observed primary currents, $i_A$, $i_B$, and $i_C$ from current sensors 46, 146, 246, 48, 148, 248) into two-phase ($\alpha\beta$-frame) quantities (e.g., determined primary currents $i_{p\alpha}$ and $i_{p\beta}$), C is expressed as follows:

$$[C] = \sqrt{\frac{2}{3}} \begin{bmatrix} 1 & -1/2 & -1/2 \\ 0 & \sqrt{3}/2 & -\sqrt{3}/2 \end{bmatrix}$$

In FIG. 7, in transform 706 "[C]" is the transformation matrix (Clarke Transformation) applied to transform three-phase (abc-coordinate) quantities (e.g., observed primary voltages, $V_{SA}$, $V_{SB}$, and $V_{SC}$ from the voltage calculator 702) into two-phase ($\alpha\beta$-frame) quantities (e.g., determined primary currents $V_{p\alpha}$ and $V_{p\beta}$).

The multiplier 708 multiplies (e.g., or determines the dot product of) the two-phase voltage and current to estimate the real power components in the two-phase ($\alpha\beta$-frame). For example, the real power components represent $P_{p\alpha}$ and $P_{p\beta}$, where $P_{p\alpha} = i_{p\alpha} \times V_{p\alpha}$ and $P_{p\beta} = i_{p\beta} \times V_{p\beta}$. Meanwhile, multiplier 718 multiplies the two-phase voltage and current to estimate the imaginary or reactive power components in the two-phase ($\alpha\beta$-frame). For example, the imaginary or reactive power components represent $Q_{p\alpha}$ and $Q_{p\beta}$, where $Q_{p\alpha} = i_{p\alpha} \times V_{p\beta}$ and $Q_{p\beta} = i_{p\beta} \times V_{p\alpha}$.

In one embodiment, a summer or integrator 710 sums samples of real power components and delayed samples of real power components for the primary active bridge 102 or primary converter to obtain primary real power $P_p$. For example, the integrator 710 may sum the samples over an integration period. An optional delay block 712 provides a unit delay (e.g., $Z^{-1}$) to the samples to derive the delayed samples. The summed real power components are inputted to a low-pass filter (LPF) 714 to smooth or average the primary real power over time. An adder 716 subtracts the average primary real power $\overline{P}_p$ from the integrated (unfiltered) primary real power $P_p$ to determine a difference or error $\tilde{P}_p$ between the average primary real power $\overline{P}_p$ and the integrated (unfiltered) primary real power $P_p$.

In one embodiment, a summer or integrator 712 sums samples of imaginary or reactive power components and delayed samples of reactive power components for the primary active bridge 102 or primary converter to obtain primary reactive power $Q_p$. For example, the integrator 720 may sum the samples over an integration period. An optional delay block 724 provides a unit delay (e.g., $Z^{-1}$) to the samples to derive the delayed samples. The summed real power components are inputted to a low-pass filter (LPF) 715 to smooth or average the primary reactive power over time. An adder 726 subtracts the average primary reactive power $\overline{Q}_p$ from the integrated (unfiltered) primary reactive power $Q_p$ to determine a difference or error $\tilde{Q}_p$ between the average primary reactive power $\overline{Q}_p$ and the integrated (unfiltered) primary reactive power $Q_p$.

Figure 8:
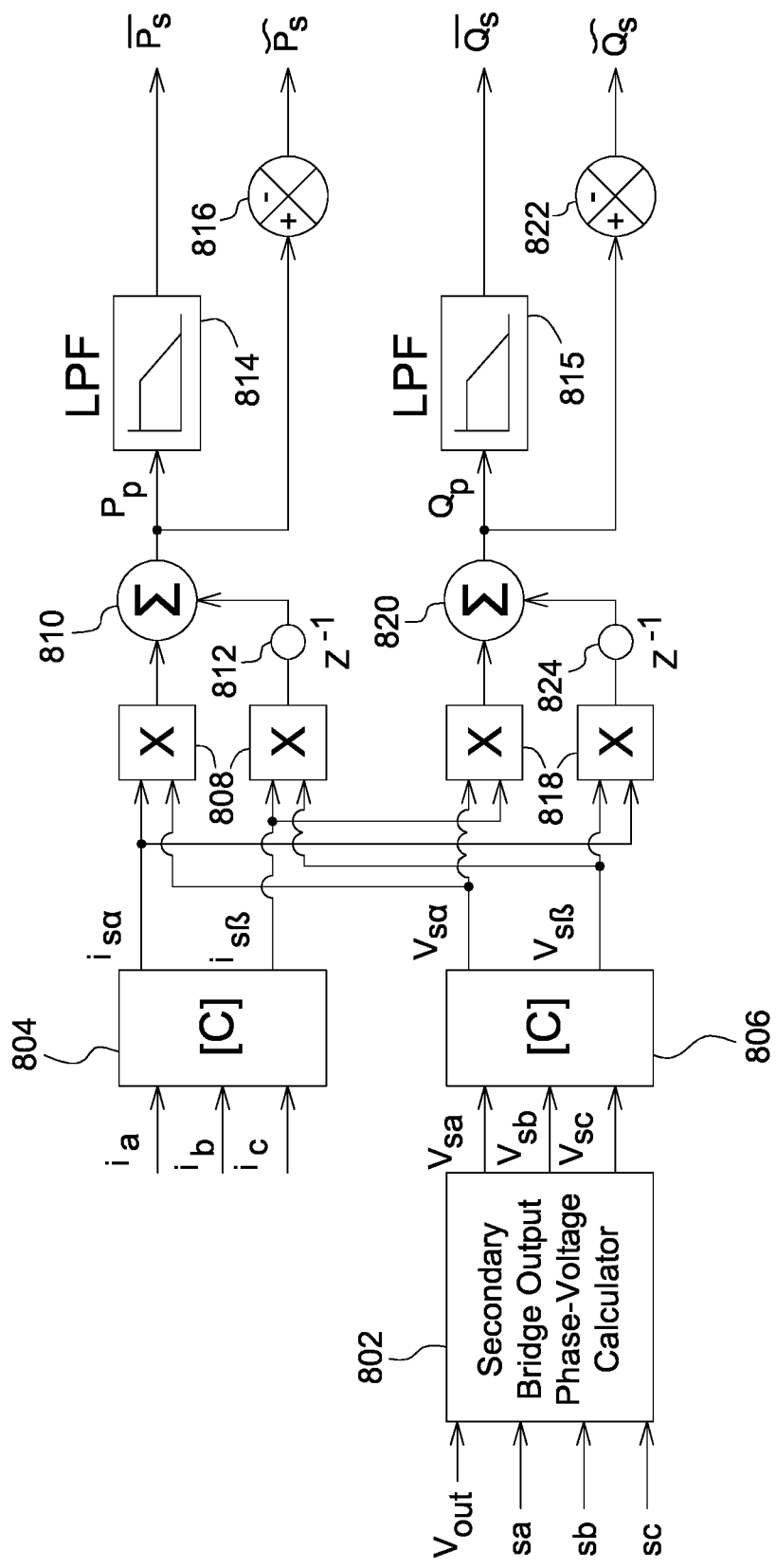
FIG. 8 is a block diagram of an electronic module or software module for determining static and dynamic real and reactive power at the output of the secondary active bridge.

FIG. 8 is a block diagram of an electronic module or software module for determining static and dynamic real and reactive power at the output of the secondary active bridge. The electronic controller 38 or the electronic data processor 32 may be configured to execute or run the secondary power estimation software module of FIG. 7, where the software module may be stored in the data storage device.

In block 802, the secondary bridge output phase-voltage calculator 802 determines the AC secondary voltage for the phase A, $V_{sa}$; the AC secondary voltage for phase B, $V_{sb}$; and the AC secondary voltage for phase C, $V_{sc}$; which may be expressed as root mean squared secondary voltage in accordance with the following equations:

$$V_{sa} = (V_{out}/3) \times (2sa - sb - sc), V_{sb} = (V_{out}/3) \times$$
$$(-sa + 2sb - sc), \text{ and } V_{sc} = (V_{out}/3) \times (-sa - sb + 2sc)$$

where Vout is the secondary DC voltage at the secondary DC voltage terminals (85, 86), which can be measured by voltage sensor 105, and where sa, sb and sc are secondary coefficients for the secondary phase a phase b, and phase c components of the secondary AC voltage or secondary AC voltages $V_{sa}$, $V_{sb}$ and $V_{sc}$.

In FIG. 8, in transform 804 "[C]" is the transformation matrix (e.g., Clarke Transformation) applied to transform three-phase (abc-coordinate) quantities (e.g., observed secondary currents, $i_a$, $i_b$, and $i_C$ from current sensors 46, 146, 246, 48, 148, 248) into two-phase ($\alpha\beta$-frame) quantities (e.g., determined secondary currents $i_{s\alpha}$ and $i_{s\beta}$), C is expressed as follows:

$$[C] = \sqrt{\frac{2}{3}} \begin{bmatrix} 1 & -1/2 & -1/2 \\ 0 & \sqrt{3}/2 & -\sqrt{3}/2 \end{bmatrix}$$

In FIG. 7, in transform 806 "[C]" is the transformation matrix (e.g., Clarke Transformation) applied to transform three-phase (abc-coordinate) quantities (e.g., observed secondary voltages, $V_{sa}$, $V_{sb}$, and $V_{sc}$ from the voltage calculator 802) into two-phase ($\alpha\beta$-frame) quantities (e.g., determined secondary currents $V_{s\alpha}$ and $V_{s\beta}$).

The multiplier 808 multiplies (e.g., or determines the dot product of) the two-phase voltage and current to estimate the real power components in the two-phase ($\alpha\beta$-frame). For example, the real power components represent $P_{s\alpha}$ and $P_{s\beta}$, where $P_{s\alpha} = i_{s\alpha} \times V_{s\alpha}$ and $P_{s\beta} = i_{s\beta} \times V_{s\beta}$. Meanwhile, multiplier 818 multiplies the two-phase voltage and current to estimate the imaginary or reactive power components in the two-phase ($\alpha\beta$-frame). For example, the imaginary or reactive power components represent $Q_{s\alpha}$ and $Q_{s\beta}$, where $Q_{s\alpha} = i_{s\alpha} \times V_{s\beta}$ and $Q_{s\beta} = i_{s\beta} \times V_{s\alpha}$.

In one embodiment, a summer or integrator 810 sums samples of real power components and delayed samples of real power components for the secondary active bridge 104 or secondary converter to obtain secondary real power $P_s$. For example, the integrator 810 may sum the samples over an integration period. An optional delay block 812 provides a unit delay (e.g., $Z^{-1}$) to the samples to derive the delayed samples. The summed real power components are inputted to a low-pass filter (LPF) 814 to smooth or average the secondary real power over time. An adder 816 subtracts the average secondary real power $\overline{P}_s$ from the integrated (unfiltered) secondary real power $P_s$ to determine a difference or error between the average secondary real power $\overline{P}_s$ and the integrated (unfiltered) secondary real power $P_s$.

In one embodiment, a summer or integrator 812 sums samples of imaginary or reactive power components and delayed samples of reactive power components for the secondary active bridge 104 or secondary converter to obtain secondary reactive power $Q_s$. For example, the integrator 820 may sum the samples over an integration period. An optional delay block 824 provides a unit delay (e.g., $Z^{-1}$) to the samples to derive the delayed samples. The summed reactive power components are inputted to a low-pass filter (LPF) 815 to smooth or average the secondary reactive power over time. An adder 822 subtracts the average secondary reactive power $\overline{Q}_s$ from the integrated (unfiltered) secondary reactive power $Q_s$ to determine a difference or error $\tilde{Q}_s$ between the average secondary reactive power $\overline{Q}_s$ and the integrated (unfiltered) secondary reactive power $Q_s$.

With knowledge of primary bridge static and dynamic real power and reactive power determined in accordance with FIG. 7 and FIG. 8, magnetic saturation of the transformer 14 and/or input and output voltage mismatch associated with the transformer turn ratio can be detected or tracked for a series of sampling intervals to trigger the electronic controller 38 or the electronic data processor to adjust the offset phase angle between switches of the same phase in the primary active bridge (102, 202) and the secondary active bridge (104, 204) for one or more adjusted sampling intervals. During normal operation of the DC-to-DC converter, the primary real power approximately equals the secondary real power, less switching-frequency-dependent transformer losses, such as core loss, series inductance loss and parallel capacitance loss, among other things; the reactive power of the primary active bridge may be influenced by a leakage inductance or series inductance of the transformer, for example.

In FIG. 1, FIG. 2 and FIG. 3, the data controller 38, electronic data processor 32 or driver is configured to control the power (e.g., power transfer between primary converter and secondary converter of the DC-to-DC converter) by controlling the relative (offset) phase-shift angle (φ) between primary switches (60,61) and secondary switches (63, 64) of like phase of the DC-to-DC converter (111, 211, 311) as per the following equations:

$$P = \frac{V_{in}^2 D}{2\pi f_s L} \phi \left( \frac{2}{3} - \frac{\phi}{2\pi} \right), 0 \le \phi \le \frac{\pi}{3} \quad (1)$$

$$P = \frac{V_{in}^2 D}{2\pi f_s L} \left( \phi - \frac{\phi^2}{\pi} - \frac{\pi}{18} \right), \frac{\pi}{3} \le \phi \le \frac{\pi}{2}$$

In FIG. 7 and FIG. 8, the electronic controller 38 or electronic data processor 32 is configured to determine P (real power) and Q (reactive power). If there is any risk of magnetic saturation of the transformer 14 and/or excessive deviation of voltage ratio (Vin/Vout) from the fixed turn ratio (n) of the transformer 14, the power measured by FIG. 7 and FIG. 8 will deviate from power commanded under Equation 1 above. Further, the electronic controller 38 or electronic data processor 32 is configured to apply the modules (e.g., software modules) of FIG. 7 and FIG. 8 to measure (material changes in) real and reactive power components to detect if there is: (a) magnetic saturation of the transformer 14, or (b) excessive deviation of voltage ratio (Vin/Vout) from the fixed turn ratio (n) of the transformer 14, or both. It is possible that magnetic saturation or excessive deviation may occur selectively and/or simultaneously, depending upon operating regime of DC-to-DC converter (111, 211, 311).

In one embodiment, material changes in real and reactive power components of power measured by the modules of FIG. 7 and FIG. 8 can also serve as indicator(s) of possible thermal stress or possible reduced longevity of the transformer 14 or of one or more switches (60, 61, 63, 64) of the DC-to-DC converter caused by selectively and/or simultaneously occurrence of following events: (1) magnetic saturation of the transformer 14, or (2) excessive reactive power that is greater than a threshold reactive power. In one example, in a forward power flow scenario, excessive reactive power can be supplied by the secondary (receiving end) active bridge in DC-to-DC converter (111, 211, 311), which tends to result because converter operation is causing voltage ratio (Vin/Vout) quite different from transfer turn ratio (n). In another example, in forward power flow scenario or the reverse power flow scenario (where there is secondary to primary transfer of electrical power), the method and system can detect magnetic saturation and/or excessive reactive power to trigger the electronic controller 38, or the electronic data processor 32 or the driver to control the switches (60, 61, 63, 64) to compensate for (and reduce) the detected saturation and excessive reactive power (e.g., to avoid thermal damage or thermal stress by reducing temporarily the power flow or target power transfer, by adjusting temporarily the phase-shift angle between the primary switches and the secondary switches, until the mismatch in reactive power subsides or until the transient change in voltage ratio subsides, such as from transient load/device operating changes at the DC primary terminals and DC secondary terminals).

For reliable operation of single or multiple units DC-to-DC converters, the method and system is well suited to detect or alleviate electrical and thermal stress that might otherwise occur if the magnetic circuit of the transformer becomes saturated by excessive current or deviation in the DC input voltage or DC output voltage of the DC-DC converter from its design range.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A method of controlling a direct-current-to-direct-current converter wherein a primary converter is coupled to a secondary converter via a transformer, the method comprising:

detecting a primary direct current voltage and a secondary direct current voltage for a sampling time interval;

detecting a respective secondary alternating current at one or more corresponding secondary alternating current nodes for the sampling time interval, where each of the secondary alternating current nodes is associated with a corresponding phase of the secondary converter;

estimating an electromagnetic circuit inductance of the transformer for the sampling time interval based on a change per unit time in the detected secondary alternating current, the detected primary direct current voltage, and the detected secondary direct current voltage;

determining a target power transfer between the primary converter to the secondary converter consistent with the estimated electromagnetic circuit inductance for the sampling time interval;

adjusting a phase offset of driver control signals between corresponding switches of the same phase of the primary converter and the secondary converter consistent with the target power transfer and the estimated electromagnetic circuit inductance, to minimize thermal energy dissipated from the direct-current-to-direct-current converter or its transformer for the sampling time interval;

detecting a respective primary alternating current at one or more corresponding primary alternating current nodes for the sampling time interval, where each of the primary alternating current nodes is associated with a corresponding phase of the secondary primary; and estimating an electromagnetic circuit inductance of the transformer for the sampling time interval based on a change per unit time in the detected primary alternating current, in the detected secondary alternating current, or in both the primary and secondary alternating currents; the detected primary direct current voltage, and the detected secondary direct current voltage.

2. A method of controlling a direct-current-to-direct-current converter wherein a primary converter is coupled to a secondary converter via a transformer, the method comprising:

detecting an primary direct current voltage and a secondary direct current voltage for a sampling time interval;

detecting a respective secondary alternating current at one or more corresponding secondary alternating current nodes for the sampling time interval, where each of the secondary alternating current nodes is associated with a corresponding phase of the secondary converter;

estimating an electromagnetic circuit inductance of the transformer for the sampling time interval based on a change per unit time in the detected secondary alternating current, the detected primary direct current voltage, and the detected secondary direct current voltage;

determining a target power transfer between the primary converter to the secondary converter consistent with the estimated electromagnetic circuit inductance for the sampling time interval;

adjusting a phase offset of driver control signals between corresponding switches of the same phase of the primary converter and the secondary converter consistent with the target power transfer and the estimated electromagnetic circuit inductance, to minimize thermal energy dissipated from the direct-current-to-direct-current converter or its transformer for the sampling time interval; and detecting a first transient variation in the primary direct current voltage based on a first change in load on the primary direct current terminals, wherein an inverter is coupled to the direct current terminals to drive an electric machine in a motoring mode to propel a vehicle.

3. The method according to claim 2 further comprising:
detecting a second transient variation in the secondary direct current voltage based on a second change in load on the secondary direct current terminals.

4. A method of controlling a direct-current-to-direct-current converter wherein a primary converter is coupled to a secondary converter via a transformer, the method comprising:

detecting an primary direct current voltage and a secondary direct current voltage for a sampling time interval;

detecting a respective secondary alternating current at one or more corresponding secondary alternating current nodes for the sampling time interval, where each of the secondary alternating current nodes is associated with a corresponding phase of the secondary converter;

estimating an electromagnetic circuit inductance of the transformer for the sampling time interval based on a change per unit time in the detected secondary alternating current, the detected primary direct current voltage, and the detected secondary direct current voltage;

determining a target power transfer between the primary converter to the secondary converter consistent with the estimated electromagnetic circuit inductance for the sampling time interval;

adjusting a phase offset of driver control signals between corresponding switches of the same phase of the primary converter and the secondary converter consistent with the target power transfer and the estimated electromagnetic circuit inductance, to minimize thermal energy dissipated from the direct-current-to-direct-current converter or its transformer for the sampling time interval; and during the sampling interval, observing whether or not the estimated electromagnetic circuit inductance is saturated based on at least one of a drop of the detected primary direct current voltage by at least a first threshold to trigger the adjusting of the phase offset to protect the switches in the secondary converter or a change in the alternating current versus time, associated with the estimated electromagnetic circuit inductance, that exceeds a second threshold to trigger the adjusting of the phase offset to protect the switches in the secondary converter or (a) a drop of the detected primary direct current voltage by at least a first threshold to trigger the adjusting of the phase offset to protect the switches in the secondary converter and (b) a change in the alternating current versus time, associated with the estimated electromagnetic circuit inductance, that exceeds a second threshold to trigger the adjusting of the phase offset to protect the switches in the secondary converter.

5. A method of controlling a direct-current-to-direct-current converter wherein a primary converter is coupled to a secondary converter via a transformer, the method comprising:

detecting an primary direct current voltage and a secondary direct current voltage for a sampling time interval;

detecting a respective secondary alternating current at one or more corresponding secondary alternating current nodes for the sampling time interval, where each of the secondary alternating current nodes is associated with a corresponding phase of the secondary converter;

estimating an electromagnetic circuit inductance of the transformer for the sampling time interval based on a change per unit time in the detected secondary alternating current, the detected primary direct current voltage, and the detected secondary direct current voltage;

determining a target power transfer between the primary converter to the secondary converter consistent with the estimated electromagnetic circuit inductance for the sampling time interval;

adjusting a phase offset of driver control signals between corresponding switches of the same phase of the primary converter and the secondary converter consistent with the target power transfer and the estimated electromagnetic circuit inductance, to minimize thermal energy dissipated from the direct-current-to-direct-current converter or its transformer for the sampling time interval; and detecting magnetic saturation and/or excessive reactive power to trigger the electronic data processor or the driver to control the switches to compensate for the detected saturation and excessive reactive power by reducing temporarily the determined target power transfer.

6. A system of controlling a direct-current-to-direct-current converter wherein a primary converter is coupled to a secondary converter via a transformer, the system comprising:

a primary voltage sensor for detecting an primary direct current voltage for a sampling time interval;
a second voltage sensor for detecting a secondary direct current voltage for the sampling time interval;
a secondary alternating current sensor for detecting a respective secondary alternating current at one or more corresponding secondary alternating current nodes for the sampling time interval, where each of the secondary alternating current nodes is associated with a corresponding phase of the secondary converter;
an estimator for estimating an electromagnetic circuit inductance of the transformer for the sampling time interval based on a change per unit time in the detected secondary alternating current, the detected primary direct current voltage, and the detected secondary direct current voltage;
an electronic data processor for determining a target power transfer between the primary converter to the secondary converter consistent with the estimated electromagnetic circuit inductance for the sampling time interval;
a driver configured to adjust a phase offset of driver control signals between corresponding switches of the same phase of the primary converter and the secondary converter consistent with the target power transfer and the estimated electromagnetic circuit inductance, to minimize thermal energy dissipated from the direct-current-to-direct current converter or its transformer for the sampling time interval; and
a primary alternating-current detector for detecting a respective primary alternating current at one or more corresponding primary alternating current nodes for the sampling time interval, where each of the primary alternating current nodes is associated with a corresponding phase of the secondary primary;
the estimator configured to estimate the electromagnetic circuit inductance of the transformer for the sampling time interval based on a change per unit time in the detected primary alternating current, in the detected secondary alternating current, or in both the primary and secondary alternating currents; the detected primary direct current voltage, and the detected secondary direct current voltage.

7. A system of controlling a direct-current-to-direct-current converter wherein a primary converter is coupled to a secondary converter via a transformer, the system comprising:

a primary voltage sensor for detecting an primary direct current voltage for a sampling time interval;
a second voltage sensor for detecting a secondary direct current voltage for the sampling time interval;
a secondary alternating current sensor for detecting a respective secondary alternating current at one or more corresponding secondary alternating current nodes for the sampling time interval, where each of the secondary alternating current nodes is associated with a corresponding phase of the secondary converter;
an estimator for estimating an electromagnetic circuit inductance of the transformer for the sampling time interval based on a change per unit time in the detected secondary alternating current, the detected primary direct current voltage, and the detected secondary direct current voltage;
an electronic data processor for determining a target power transfer between the primary converter to the secondary converter consistent with the estimated electromagnetic circuit inductance for the sampling time interval;
a driver configured to adjust a phase offset of driver control signals between corresponding switches of the same phase of the primary converter and the secondary converter consistent with the target power transfer and the estimated electromagnetic circuit inductance, to minimize thermal energy dissipated from the direct-current-to-direct current converter or its transformer for the sampling time interval; and
a disturbance estimator or observer module configured to detect a first transient variation in the primary direct current voltage based on a first change in load on the primary direct current terminals, wherein an inverter is coupled to the direct current terminals to drive an electric machine in a motoring mode to propel a vehicle.

8. The system according to claim 7 further comprising:
the disturbance estimator or the observer configured to detect a second transient variation in the secondary direct current voltage based on a second change in load on the secondary direct current terminals.

9. A system of controlling a direct-current-to-direct-current converter wherein a primary converter is coupled to a secondary converter via a transformer, the system comprising:

a primary voltage sensor for detecting an primary direct current voltage for a sampling time interval;
a second voltage sensor for detecting a secondary direct current voltage for the sampling time interval;
a secondary alternating current sensor for detecting a respective secondary alternating current at one or more corresponding secondary alternating current nodes for the sampling time interval, where each of the secondary alternating current nodes is associated with a corresponding phase of the secondary converter;
an estimator for estimating an electromagnetic circuit inductance of the transformer for the sampling time interval based on a change per unit time in the detected secondary alternating current, the detected primary direct current voltage, and the detected secondary direct current voltage;

an electronic data processor for determining a target power transfer between the primary converter to the secondary converter consistent with the estimated electromagnetic circuit inductance for the sampling time interval;

a driver configured to adjust a phase offset of driver control signals between corresponding switches of the same phase of the primary converter and the secondary converter consistent with the target power transfer and the estimated electromagnetic circuit inductance, to minimize thermal energy dissipated from the direct-current-to-direct current converter or its transformer for the sampling time interval; and during the sampling interval, a disturbance estimator or an observer configured to determine whether or not the estimated electromagnetic circuit inductance is saturated based on at least one of a drop of the detected primary direct current voltage by at least a first threshold to trigger the adjusting of the phase offset to protect the switches in the secondary converter or a change in the alternating current versus time, associated with the estimated electromagnetic circuit inductance, that exceeds a second threshold to trigger the adjusting of the phase offset to protect the switches in the secondary converter or (a) a drop of the detected primary direct current voltage by at least a first threshold to trigger the adjusting of the phase offset to protect the switches in the secondary converter and (b) a change in the alternating current versus time, associated with the estimated electromagnetic circuit inductance, that exceeds a second threshold to trigger the adjusting of the phase offset to protect the switches in the secondary converter.

10. A system of controlling a direct-current-to-direct-current converter wherein a primary converter is coupled to a secondary converter via a transformer, the system comprising:

a primary voltage sensor for detecting an primary direct current voltage for a sampling time interval;

a second voltage sensor for detecting a secondary direct current voltage for the sampling time interval;

a secondary alternating current sensor for detecting a respective secondary alternating current at one or more corresponding secondary alternating current nodes for the sampling time interval, where each of the secondary alternating current nodes is associated with a corresponding phase of the secondary converter;

an estimator for estimating an electromagnetic circuit inductance of the transformer for the sampling time interval based on a change per unit time in the detected secondary alternating current, the detected primary direct current voltage, and the detected secondary direct current voltage;

an electronic data processor for determining a target power transfer between the primary converter to the secondary converter consistent with the estimated electromagnetic circuit inductance for the sampling time interval; and a driver configured to adjust a phase offset of driver control signals between corresponding switches of the same phase of the primary converter and the secondary converter consistent with the target power transfer and the estimated electromagnetic circuit inductance, to minimize thermal energy dissipated from the direct-current-to-direct current converter or its transformer for the sampling time interval;

wherein the electronic data processor is configured to detect magnetic saturation and/or excessive reactive power to trigger the electronic data processor or the driver to control the switches to compensate for the detected saturation and excessive reactive power by reducing temporarily the target power transfer.

* * * * *